(12) United States Patent
Ogino et al.

(10) Patent No.: US 6,263,153 B1
(45) Date of Patent: Jul. 17, 2001

(54) VIDEO SIGNAL TRANSMISSION METHOD, SUPERIMPOSED INFORMATION EXTRACTION METHOD, VIDEO SIGNAL OUTPUT DEVICE, VIDEO SIGNAL RECORDING DEVICE, AND VIDEO SIGNAL RECORDING MEDIUM

(75) Inventors: Akira Ogino, Chiba; Nozomu Ikeda, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/974,624

(22) Filed: Nov. 19, 1997

(30) Foreign Application Priority Data

Dec. 10, 1996 (JP) .................................................. 08-346784

(51) Int. Cl.[7] ................................................... H04N 5/913
(52) U.S. Cl. .................................. 386/94; 386/95; 386/46
(58) Field of Search .................................. 386/94, 95, 46, 386/52, 61, 1, 4; 380/3, 4, 5, 9, 10; 360/15, 60

(56) References Cited

U.S. PATENT DOCUMENTS 3,984,624   10/1976  Waggener .
5,319,735 * 6/1994  Preuss et al. ........................ 395/2.14
6,023,551 * 2/2000  Sugita et al. ............................ 386/94
6,058,243   5/2000  Ogino et al. ............................ 386/94
6,195,129   6/2001  Ogino et al. .......................... 346/469

FOREIGN PATENT DOCUMENTS 0360615   3/1990  (EP) .

* cited by examiner

Primary Examiner—Robert Chevalier
(74) Attorney, Agent, or Firm—Jay H. Maioli

(57) ABSTRACT

A circuit to extract spectrally spread additional information superimposed on the video signal rapidly and correctly. The output device 10 generates the PN code string every second vertical interval with reference to the video sync signal, and spectrally spreads the additional information using this PN code string. The spectrally spread additional information is superimposed on the video signal every second vertical interval and outputted. Upon receiving the video signal, in the recording device for recording the video signal on a recording medium, the video signal component cancel each other between the video signal component in the vertical interval on which the additional information is superimposed and the video signal component in the vertical interval on which the additional information is not superimposed because of the field correlation of the video signal, and only the additional information is extracted.

12 Claims, 15 Drawing Sheets

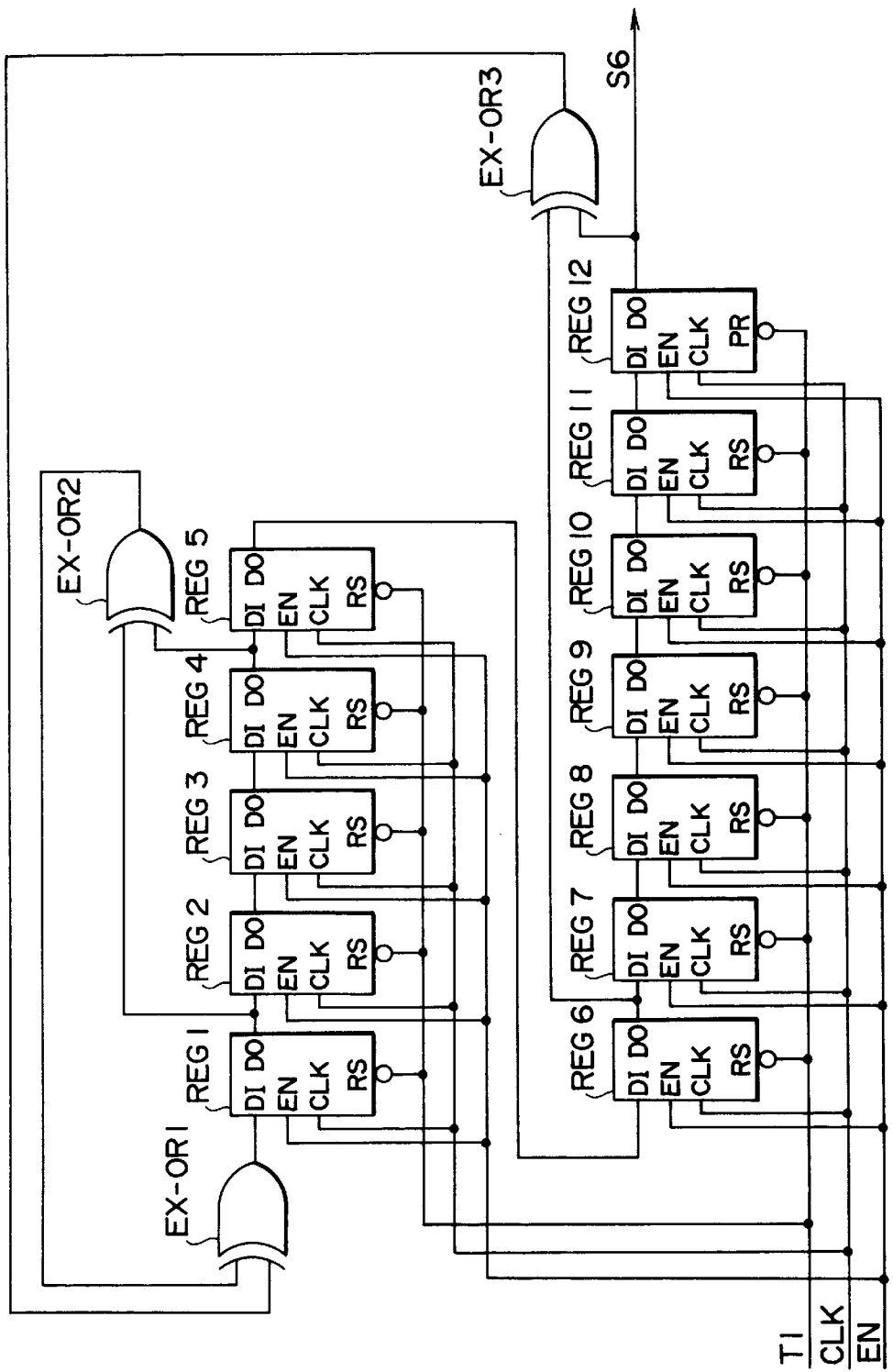
F I G. 5

ANTI-DUPLICATION CONTROL SIGNAL SPECTRUM
BEFORE SPECTRAL SPREADING

ANTI-DUPLICATION CONTROL SIGNAL SPECTRUM
AFTER SPECTRAL SPREADING

SPECTRUM OF INFORMATION SIGNAL ON WHICH SS ANTI-DUPLICATION CONTROL SIGNAL IS SUPERIMPOSED

SIGNAL SPECTRUM AFTER SPECTRAL INVERSION SPREADING IN MEMORY DEVICE SIDE

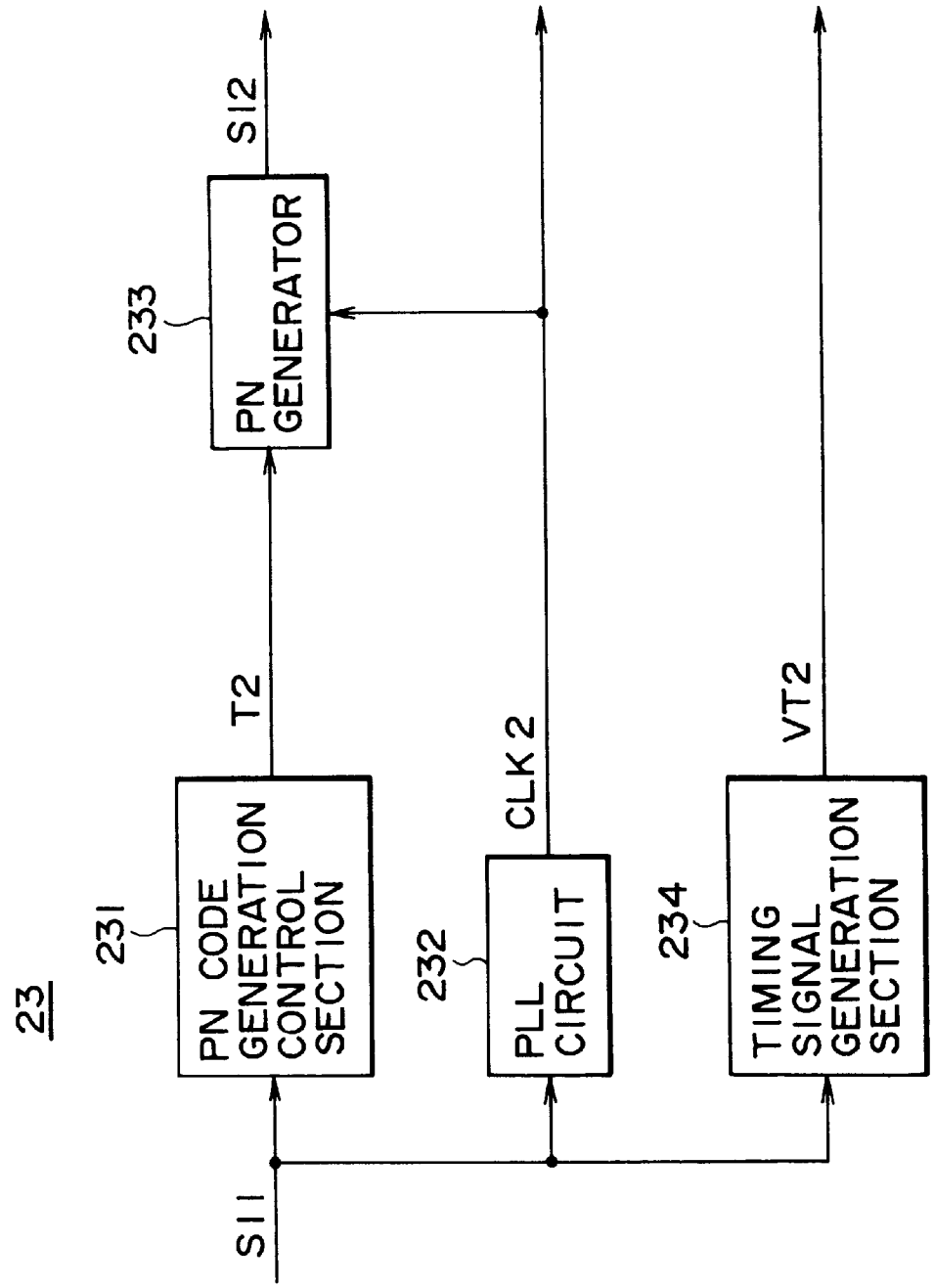

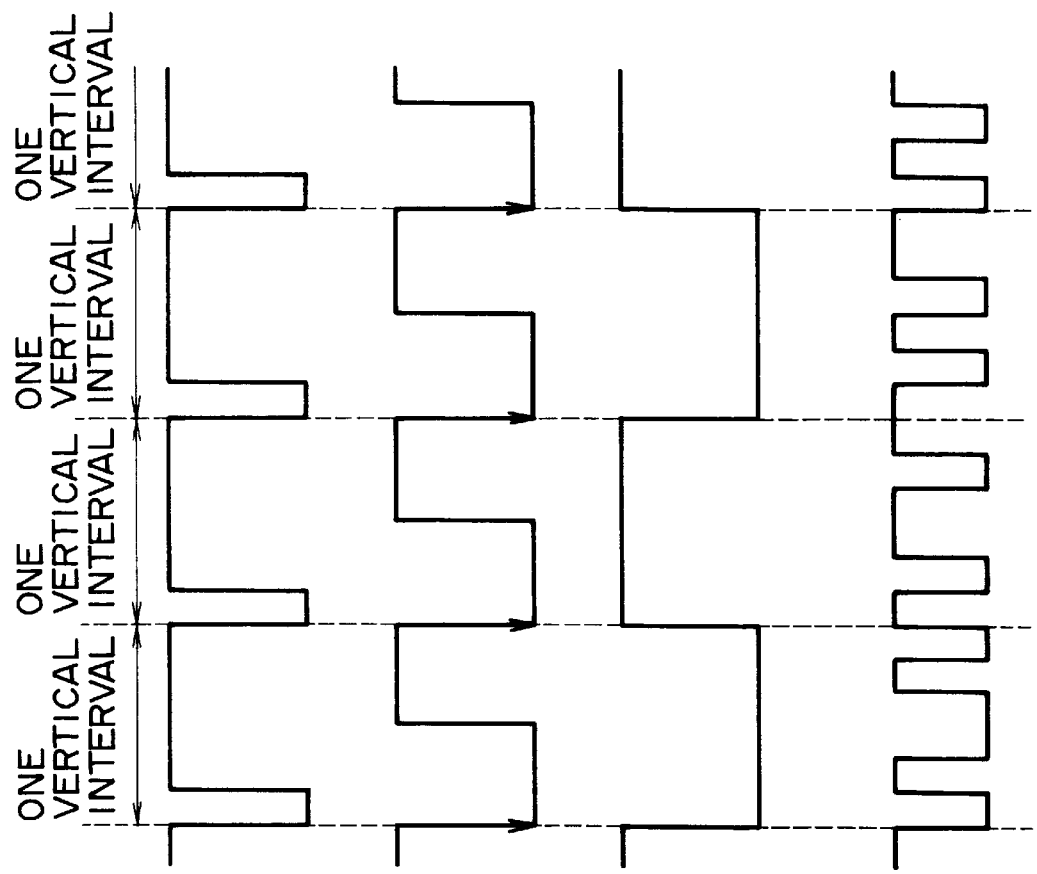

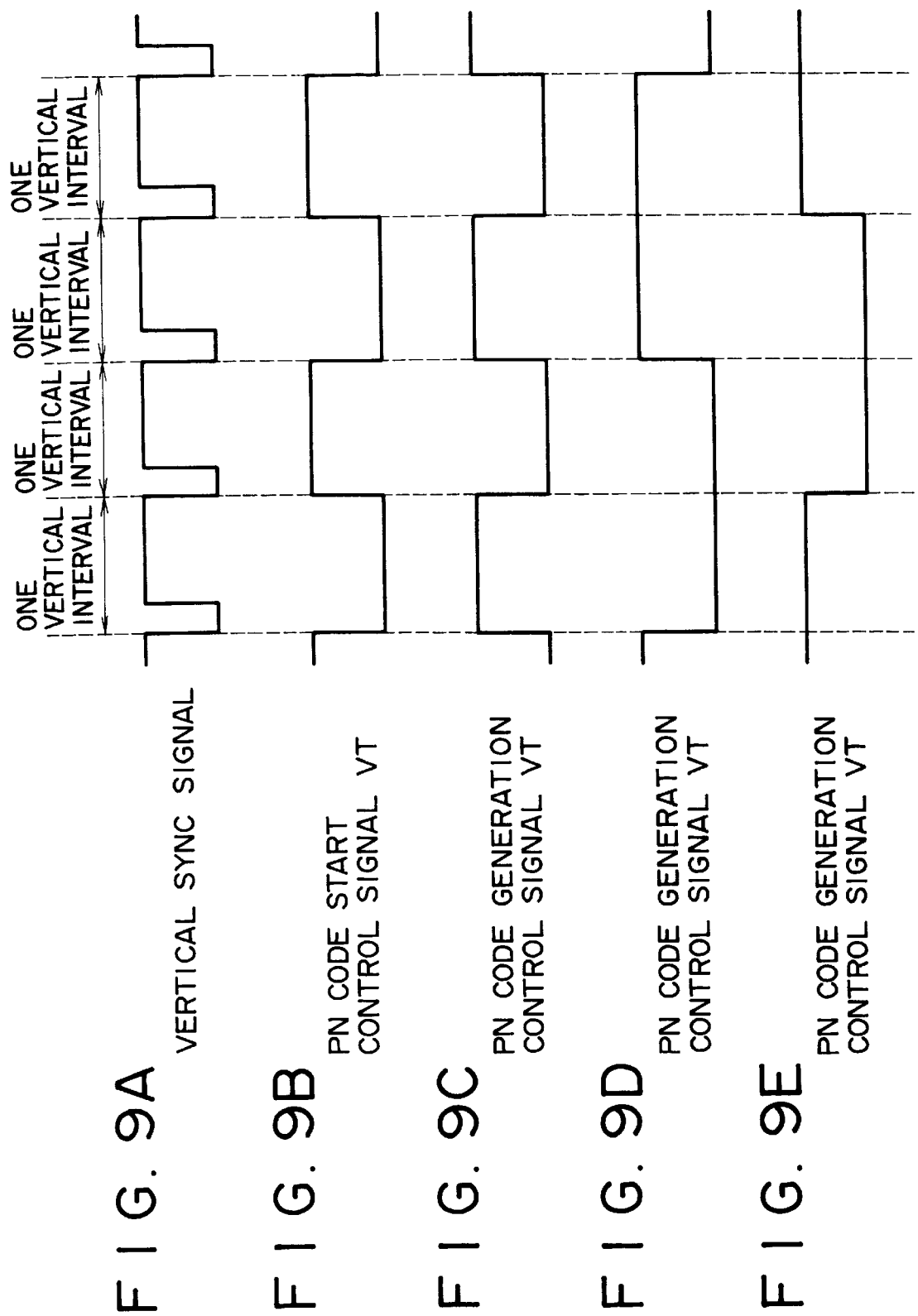

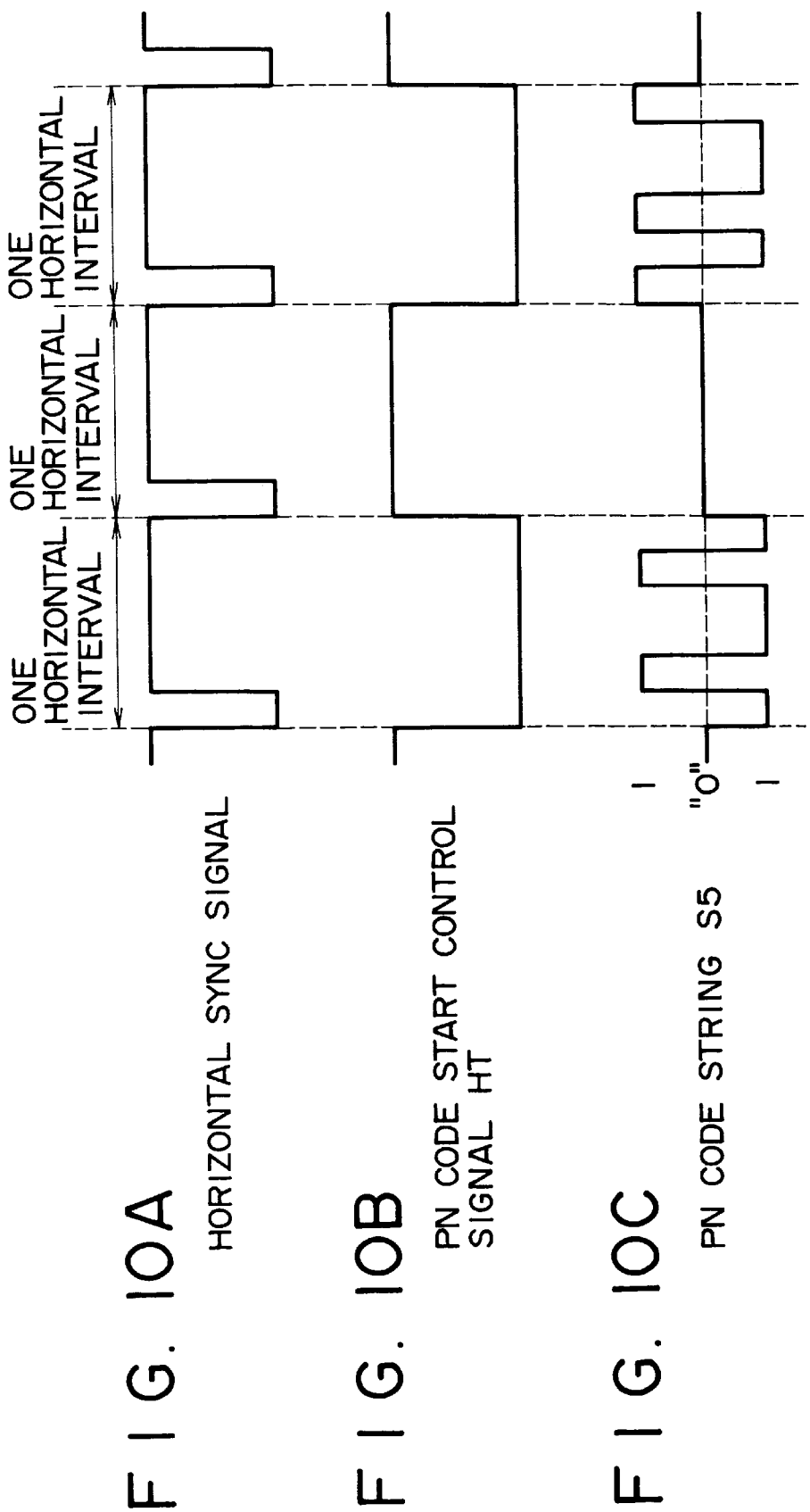
FIG. 10A HORIZONTAL SYNC SIGNAL
FIG. 10B PN CODE START CONTROL SIGNAL HT
FIG. 10C PN CODE STRING S5

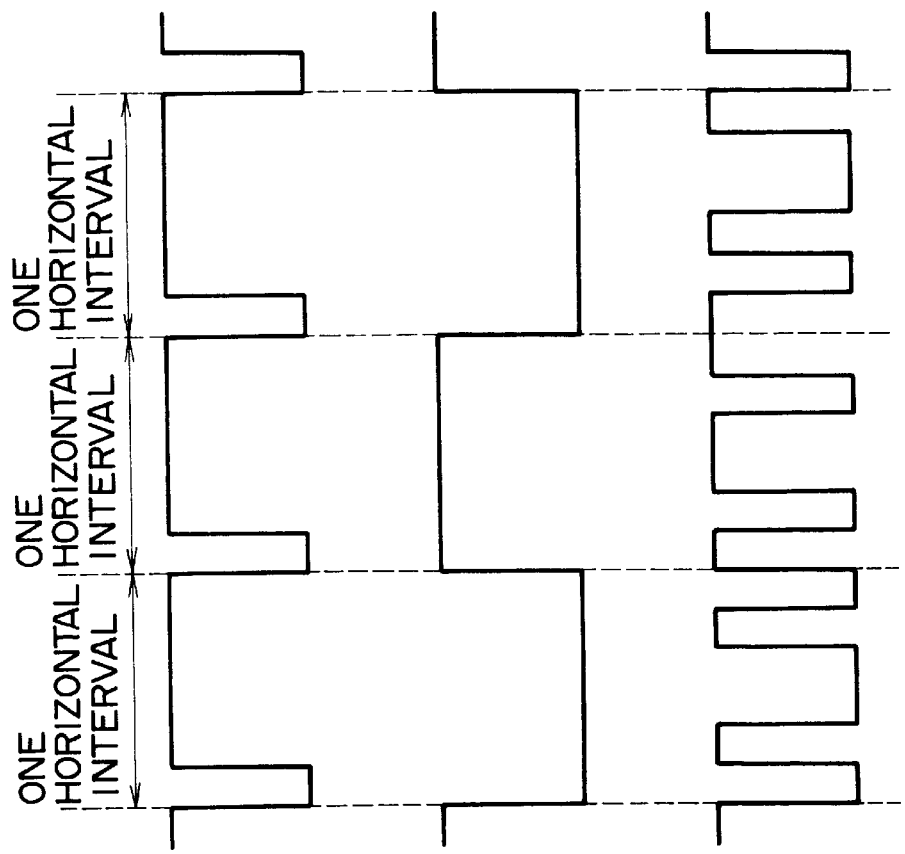

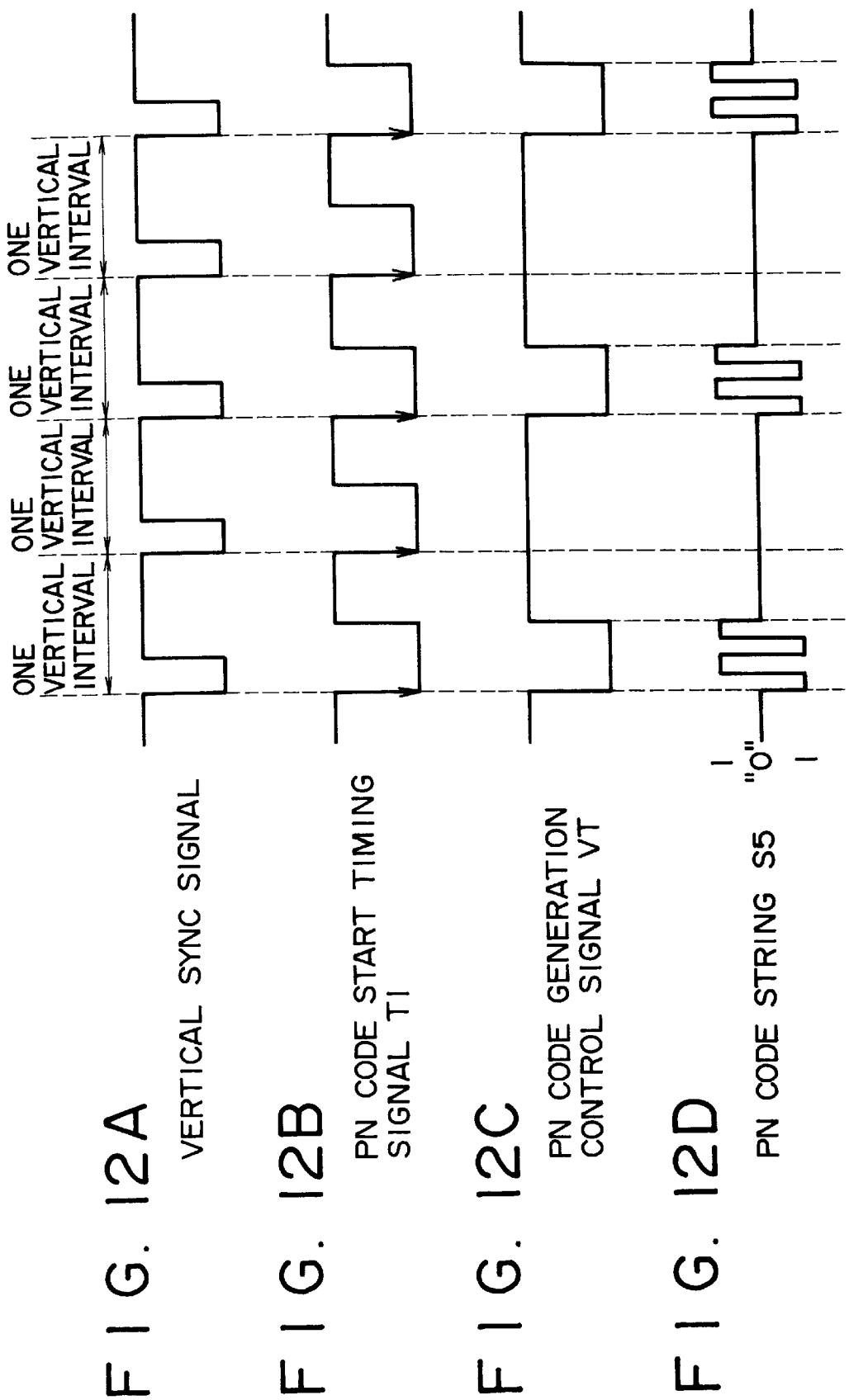

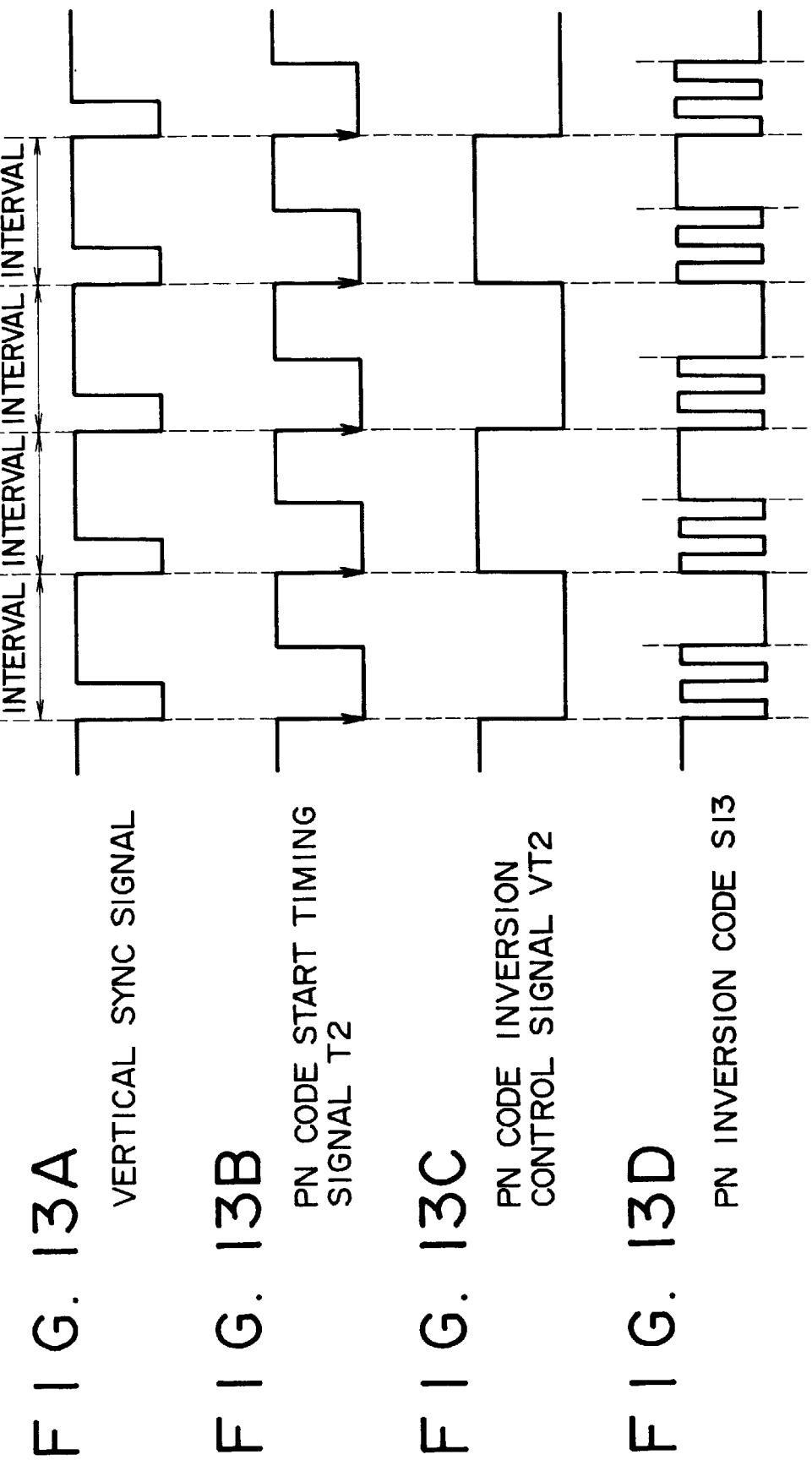

VIDEO SIGNAL TRANSMISSION METHOD, SUPERIMPOSED INFORMATION EXTRACTION METHOD, VIDEO SIGNAL OUTPUT DEVICE, VIDEO SIGNAL RECORDING DEVICE, AND VIDEO SIGNAL RECORDING MEDIUM

BACKGROUND OF THE INVENTION

1. Field of the Invention

This invention relates to a method, device, and video signal recording medium which are made capable of anti-duplication control, for example, in the case that a video signal recorded on a recording medium is played back and transmitted together with an information for preventing duplication, and the recording of the transmitted and received video signal on another recording medium is inhibited or restricted, by way of a method involving a video signal on which the additional information is superimposed is output, the superimposed additional information is extracted from the received signal, and the extracted additional information is utilized to prevent duplication.

2. Description of the Related Art

VTR (Video Tape recording devices) has been popularized in daily life, and many kinds of software which can be played back on a VTR are supplied abundantly. Digital VTR or DVD (Digital Video Disks) playback devices have been available practically now, and provide images and sound of exceptionally high quality.

On the other hand, there is, however, a problem in that this great abundance of software can be copied without restriction, and several methods have already been proposed to inhibit duplication.

For example, for a VTR which outputs an analog video signal, one method to prevent copying uses a difference in the AGC (Automatic Gain Control) system, or in the APC (Automatic Phase Control) system, of the VTR recording device and of a monitor receiver for displaying the image.

When the method which utilizes the difference in AGC system, in which a VTR performs AGC using a pseudo sync signal inserted in the video signal and a monitor receiver employs a different AGC system not using the pseudo sync signal, is used, a very high level pseudo sync signal is inserted in the video signal supplied from the playback VTR and the video signal with insertion is output to the recording VTR as an AGC sync signal.

When the method which utilizes the difference in APC characteristics, in which a VTR performs APC using the phase of the color burst signal itself in the video signal and a monitor receiver employs an APC system different from that of the VTR, is used, the phase of the color burst of the video signal supplied from the playback VTR to the recording VTR is inverted partially.

As a result, the monitor receiver which receives the analog video signal from the playback VTR plays back the image correctly without being affected by the pseudo sync signal in AGC or the partial phase inversion of the color burst signal used for APC.

On the other hand, in a VTR, which is supplied with the analog video signal from the playback VTR into which pseudo sync signals have been inserted or which has been subjected to color burst signal phase inversion control as described herein above, for receiving such analog video signal and for recording the analog video signal on a recording medium, proper gain control or phase control based on the input signal cannot be performed, and so the video signal is not correctly recorded. Even if this signal is played back, therefore, normal picture and sound cannot be obtained.

In the case of a digitized video signal, for example, in a digital VTR, an anti-duplication signal or an anti-duplication control signal comprising, for example, a duplication ranking control code, is added as digital data to the video signal and recorded on the recording medium, so as to prevent or control duplication of the image.

In this case, the playback digital VTR reads the video signal, audio signal and anti-duplication control signal, and supplies them as digital or analog data to a recording digital VTR.

In the digital VTR used as a recording device, the anti-duplication control signal is extracted from the supplied playback signal, and recording of the playback signal is then controlled based on the anti-duplication control signal. For example, when the anti-duplication control signal comprises an anti-duplication signal, the recording VTR does not perform recording.

Alternatively, when the anti-duplication control signal comprises a duplication ranking control code, recording is controlled by this ranking control code. For example, when the duplication ranking code limits duplication to one copy, the digital VTR used for recording adds the anti-duplication code before recording the video signal and audio signal on the recording medium as digital data. It is thereafter impossible to duplicate the video signal from the copy.

Hence, in the case of a digital connection when the video signal, the audio signal, and the anti-duplication control signal used as digital signals are supplied to the digital VTR used as a recording device, anti-duplication control is performed on the recording side using the anti-duplication control signal by supplying this signal to the digital VTR as digital data.

However, in the case of an analog connection where the video signal and audio signal are supplied as analog signals to a digital VTR used as a recording device (the digital VTR performs A/D conversion), D/A conversion of a signal to be supplied to the recording device causes the loss of the anti-duplication control signal because the anti-duplication control signal is not superimposed on the analog information signal such as a video signal and audio signal. Hence, in the case of an analog connection, an anti-duplication control signal must be added to the D/A converted image or sound signal, and this addition causes deterioration of the video signal and audio signal.

It is, therefore, difficult to add an anti-duplication control signal and to extract it in the recorder for the purpose of anti-duplication control, without causing deterioration of the D/A converted video signal or audio signal.

Conventionally, therefore, in the case of an analog connection, duplication was prevented by an anti-duplication method using a difference in the AGC, or a difference in APC characteristics, between the VTR and the monitor receiver However, in some cases, when anti-duplication is prevented using the above-mentioned difference in the AGC or a difference in APC characteristics between the VTR and the monitor receiver, depending on the type of AGC or APC characteristics in the recording side, the video signal may nevertheless be correctly recorded, in this case, it might happen that duplication cannot be prevented, or that the reproduced image on the monitor receiver is distorted. Further, it is troublesome to change the anti-duplication method depending on whether there is an analog connection or a digital connection.

To solve such problems, an anti-duplication method in which a spectrally spread anti-duplication control signal is superimposed on a video signal can be used for both digital connections and analog connections without deterioration of the image or sound which is played back.

According to this method, a PN (Pseudorandom Noise) sequence code (referred to hereinafter as PN code) used as a spread code is generated with a sufficiently short period and spectrally spread by multiplying it by the anti-duplication control signal. In this way, a narrow-bandwidth high-level anti-duplication control signal is converted to a wide-band low-level signal which does not affect the video signal or sound signal. This spectrally spread anti-duplication control signal is then superimposed on the analog video signal, and recorded on a recording medium. In this case, the signal to be recorded on a recording medium may be an analog signal or a digital signal.

In the case that the recording medium does not carry a recorded video signal on which a spectrally spread anti duplication control signal is superimposed but the recording medium carries a recorded video signal on which an anti duplication control signal is recorded together with the video signal in the different other system, in the playback device, the anti-duplication control signal is extracted from the playback signal, spectrally spread, and superimposed on the video signal to be output.

On the other hand, in the recording device side, phase control is performed on the input video signal so that a PN code having the same generation timing and phase as those of the PN code used for spectrally spreading the anti-duplication control signal, and inversion spectral spreading is performed for extracting the original anti-duplication control signal by multiplying the video signal on which the spectrally spread anti-duplication control signal is superimposed by the PN code. Hence, the duplication prevention control is performed based on the anti-duplication control signal extracted by inversion spectral spreading.

In this way, the anti-duplication control signal is spectrally spread and superimposed on the video signal as a wide-band low-level signal. It is therefore difficult for a person who wishes to illegally duplicate the video signal, to remove the anti-duplication control signal which is superimposed on it.

However, it is possible to detect and use the superimposed anti-duplication control signal by inversion spectral spreading. This anti-duplication control signal is therefore supplied to the recording device together with the video signal. On the recording side, the anti-duplication control signal is detected, and duplication is consistently controlled according to the detected anti-duplication control signal.

According to this method, as described herein above, the spectrally spread anti-duplication control signal is superimposed as a wide band, low level signal on the video signal, but it must be superimposed at a low level so that S/N ratio is higher than that of the video signal in order not to cause deterioration of the video signal.

To superimpose the spectrally spread anti-duplication control signal at a low level so that S/N ratio is higher than that of the video signal, and to be able to detect the anti-duplication control signal superimposed on the video signal in the recording device, the number of the PN codes (PN code length) required to spectrally spread a 1 bit anti-duplication control signal must be sufficiently large. The PN code length per bit of the anti-duplication control signal may also be expressed as a spread gain (spread factor) which is the ratio (T/TC) of a time width T per bit of the anti-duplication control signal to a time width TC of one part (one chip) of the PN code. As described hereinafter, this spread gain is obtained corresponding to the S/N ratio of the information signal on which the anti-duplication control signal is superimposed, in this case, corresponding to the S/N ratio of the video signal.

For example, when the S/N ratio of the video signal on which the anti-duplication control signal is superimposed is 50 dB, the anti-duplication control signal which is spectrally spread and superimposed on the video signal must be superimposed at a low level so that S/N ratio is higher than 50 dB, which is the S/N ratio of the video signal. Also, in order to detect the anti-duplication control signal superimposed on the video signal, its S/N ratio must be sufficient for the spectrally spread signal to be fully demodulated. If this S/N ratio is 10 dB, a spread gain of 60 dB (S/N ratio of 50 dB for video signal+S/N ratio of 10 dB necessary for detection) is required. In this case, the PN code length per bit of the anti-duplication control signal is 1 million code length.

In the case of a video signal on which a spectrally spread additional information is superimposed, spread gain can not be made small because of significant adverse effect of the superimposed additional information on the video signal and necessary S/N ratio required for extraction of the superimposed additional information.

To cope with this problem alternatively, if a large number of spread codes required for spectrally spreading an additional information per one bit is used, it takes a long time to perform inversion spectral spreading for extracting the spectrally spread additional information, and adequate control corresponding to the additional information superimposed on a video signal can not be performed.

For example, in the case of the anti-duplication control signal of inhibition of duplication, a video signal recording device which records a video signal until an anti-duplication control signal is detected completes recording of the supplied video signal before the anti-duplication control signal is detected.

Also in the case of the anti-duplication control signal of permission of duplication, a video signal recording device which does not record a video signal until an anti-duplication control signal is detected can not record the video signal supplied before the anti-duplication control signal is detected.

In view of the above-mentioned problem, it is an object of the present invention to provide a method, device, and recording medium which are capable of extracting rapidly and correctly a spectrally spread anti-duplication control signal superimposed on a video signal to eliminate the above-mentioned problem.

SUMMARY OF THE INVENTION

To solve the above-mentioned problem, a video signal transmission method described in claim 1 in accordance with the present invention is a method for transmitting a spectrally spread additional information superimposed on a video signal, wherein the spectrally spread additional information is superimposed on every second interval of correlative video signal intervals.

A superimposed information extraction method described in claim 5 in accordance with the present invention is a method for extracting an additional information from a video signal on which the spectrally spread additional information is superimposed every second interval of correlative video signal intervals, wherein the additional information superimposed on the video signal is extracted by performing inversion spectral spreading with aid of the same spreading code as used for spectrally spreading the additional information for the interval of the correlative video signal intervals on which the spectrally spread additional information is superimposed, and on the other hand, with aid of a spreading code having the polarity different from the spreading code used for spectral spreading for the interval on which the spectrally spread additional information is not superimposed.

A superimposed information extraction method described in claim 9 in accordance with the present invention is a method for extracting an additional information from a video signal on which the spectrally spread additional information is superimposed every second interval of correlative video signal intervals, wherein the spectrally spread additional information is extracted by determining the difference between the interval of the correlative video signal intervals on which the spectrally spread additional information is superimposed and the interval on which the spectrally spread additional information is not superimposed, and followed by inversion spectral spreading of the resultant difference.

According to the video signal transmission method in accordance with the present invention, a spectrally spread anti-duplication control signal is superimposed on correlative video signal predetermined interval of the video signal, for example, every second vertical interval (field), and transmitted.

According to the superimposed information extraction method in accordance with the present invention, the spread code having different polarity is generated depending on the video signal on which the spectrally spread anti-duplication control signal is superimposed intermittently every second interval of the correlative video signal predetermined intervals as described herein above, in this case, every second field, that is, depending on which type of video signal interval is involved, the video signal interval on which the additional information is superimposed or the video signal interval on which the additional information is not superimposed.

In detail as described herein above, the same spread code as used for spectrally spreading the additional information is generated for the field on which the additional information is superimposed. On the other hand, a spread code having the opposite polarity to that of the spread code used for spectral spreading is generated for the field on which the additional information is not superimposed.

As described herein above, inversion spectral spreading is performed using the inversion spectral spreading spread code having different polarity every second correlative video signal predetermined interval, and the spectrally spread additional information superimposed on the video signal is extracted.

In this case, while inversion spectral spreading, the video signal on which the spectrally spread additional information is superimposed every second field is multiplied by the inversion spreading spread code having different polarity depending on which one of the additional information-superimposed field and the additional information-not-superimposed field is involved, and the resultant signal is integrated, thereby the additional information superimposed on the video signal is extracted.

In this case, the playback signal supplied from the output device is multiplied by the inversion spreading spread code, thereby the polarity of the video signal component in the playback signal is inverted between the field on which the additional information is superimposed and the field on which the additional information is not superimposed. The video signal is a signal which is correlative between adjacent fields. Therefore, integration during inversion spectral spreading results in cancellation and offset of the video signal component of adjacent fields having respectively different polarity.

Hence, the high level video signal component is canceled, and the spectrally spread additional information superimposed on the video signal is detected efficiently. Thus, the additional information detection efficiency is improved, and the spread gain can be reduced.

According to the superimposed information extraction method in accordance with the present invention, the video signal on which the spectrally spread additional information is superimposed intermittently every second correlative video signal predetermined interval, for example, every second field is received, and the difference of the video signal between correlative adjacent fields is calculated. In other words, the video signal of the field on which the additional information is not superimposed is subtracted from the video signal on which the additional information is superimposed to obtain the difference.

The video signal is a signal which is correlative between fields as described herein above. Therefore, by calculating the difference, the video signal component is canceled and the difference is extracted. The extracted difference is the spectrally spread additional information superimposed on the video signal, and by performing inversion spectral spreading using the same spread code as used for spectral spreading on the difference signal, the additional information is extracted.

In this case also, the high level video signal component is canceled, as the result, the spectrally spread additional information superimposed on the video signal is detected efficiently and rapidly. Thus, the additional information detection efficiency is improved, and the spread gain is reduced.

BRIEF DESCRIPTION OF THE DRAWINGS

FIG. 5 is a diagram for describing one example of the PN code generator shown in FIG. 3.

FIG. 7 is a block diagram for illustrating one example of the PN code generation section of the video signal recording device shown in FIG. 2.

FIGS. 8A to 8D are diagrams for describing one example of the inversion spreading PN code string generated in the video signal recording device shown in FIG. 2.

FIGS. 9A to 9E are diagrams for describing the PN code string generation and stop timing in the video signal output device in accordance with the present invention.

FIGS. 10A to 10C are diagrams for describing another example of the PN code string generated in the video signal output device in accordance with the present invention.

FIGS. 11A to 11C are diagrams for describing another example of the inversion spreading PN code string generated in the video signal recording device in accordance with the present invention.

FIGS. 12A to 12D are diagrams for describing yet another example of PN code string generated in the video signal output device in accordance with the present invention.

FIGS. 13A to 13D are diagrams for describing yet another example of the inversion spreading PN code string generated in the video signal recording device in accordance with the present invention.

DETAILED DESCRIPTION OF THE PREFERRED EMBODIMENTS

One embodiment of a video signal transmission method, superimposed information extraction method, video signal output device, video signal recording device, and video signal recording medium will be described in detail hereinafter with reference to the drawings.

A video signal output device and video signal recording device both will be described hereinafter as devices which are applied to a recording/playback device (abbreviated as DVD device hereinafter) of a DVD (digital video disk). For simplification, the audio signal system is omitted from description.

As will be described in detail hereinafter, in the video signal duplication control system comprising the video signal output system and video signal recording system of this embodiment described hereinafter, a PN (Pseudorandom Noise) sequence code (PN code) is used as a spread code, an anti-duplication control signal is spectrally spread and superimposed on a video signal as an additional information in the video signal output device, the superimposed signal is subjected to inversion spectral spreading to extract the anti-duplication control signal in the video signal recording device, and the duplication control of this video signal is performed using this extracted anti-duplication control signal.

Figure 1:
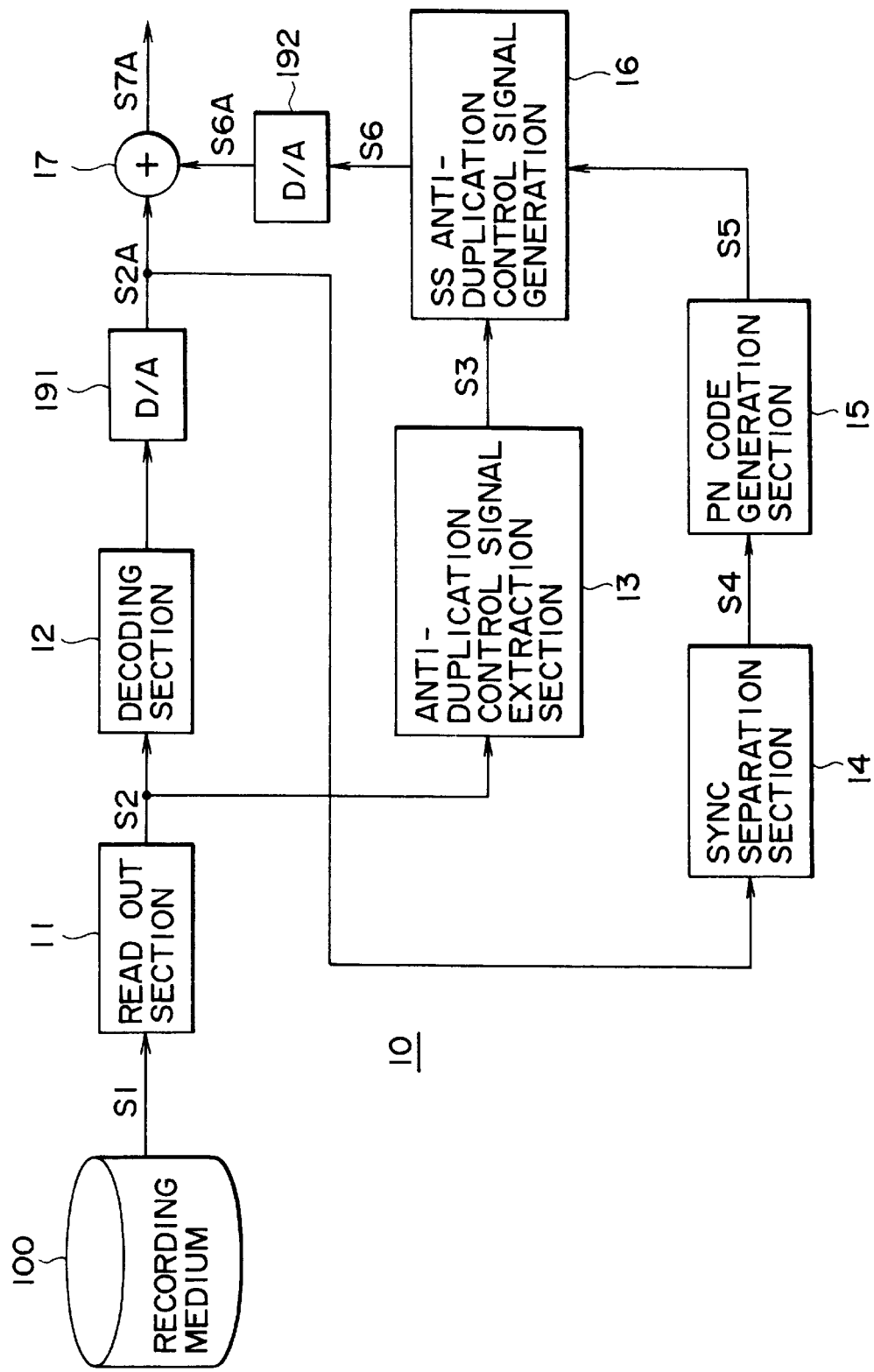
FIG. 1 is a block diagram for illustrating one embodiment of the video signal output device in accordance with the present invention.
Figure 2:
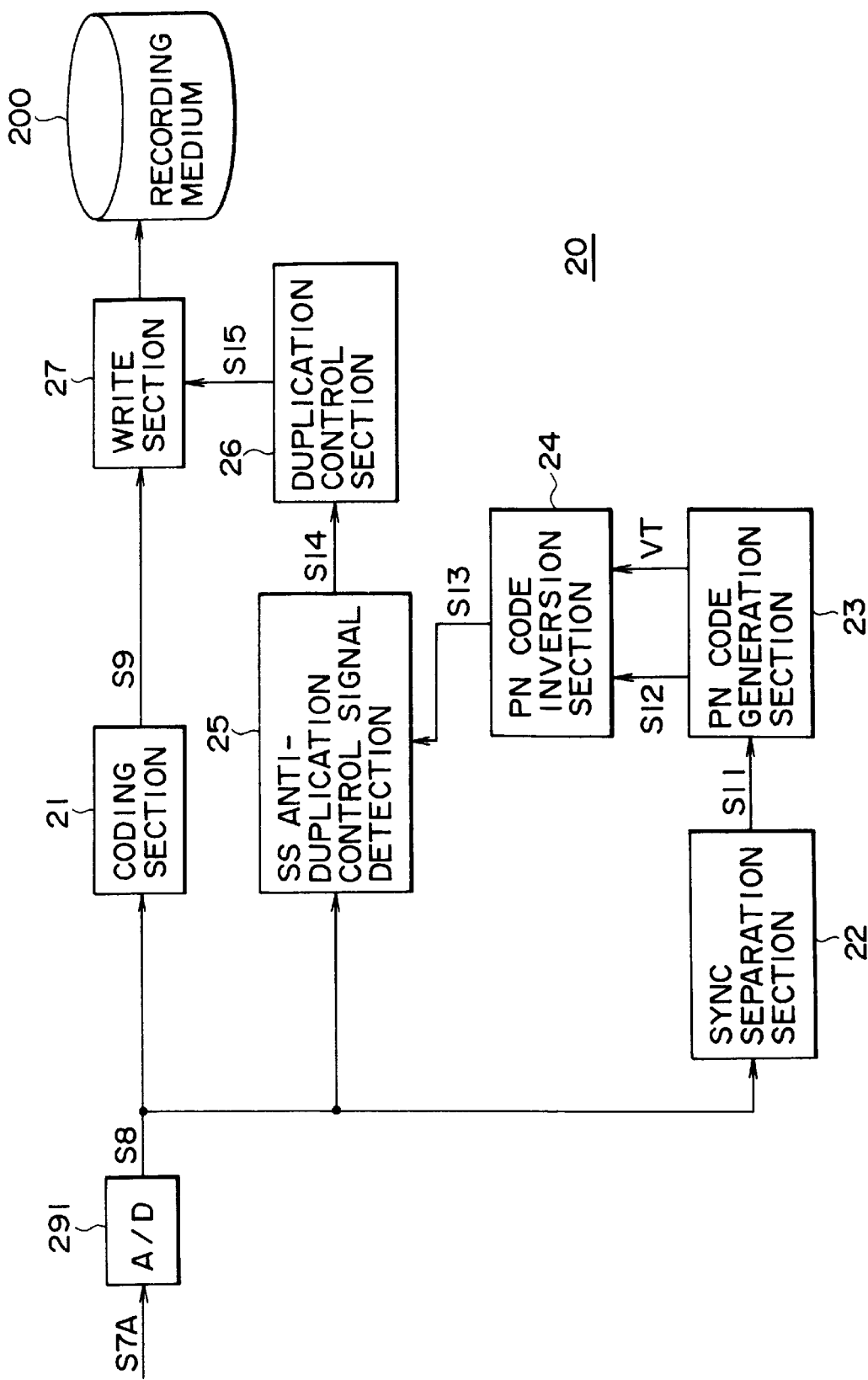
FIG. 2 is a block diagram for illustrating one embodiment of the video signal recording device in accordance with the present invention.

FIG. 1 and FIG. 2 are drawings for describing an image output device (referred to simply as output device hereinafter) 10 and an image recording device (referred to simply as recording device hereinafter) 20 used in an image anti-duplication control system according to this embodiment. In other words, the output device 10 corresponds to the output system of a DVD device, and the recording device 20 corresponds to the recording system of a DVD device.

In FIG. 1, on a recording medium 100, digitized images and audio signals are recorded together with an anti-duplication control signal as additional information. The recording medium 100 is a DVD in this embodiment. The anti-duplication control signal may be recorded on the innermost or outermost TOC or a track area known as the directory, or it may be inserted on a track in which image data or audio data is recorded, namely, on an area different from the data recording area. An example described hereinafter is of the latter case, namely the anti-duplication control signal is read out at the same time as the video signal is read out.

In this embodiment, the anti-duplication control signal may be a signal for limiting the number of duplications such as a signal for permitting only the first duplication. To simplify the description in this embodiment, the anti-duplication control signal is a 1 bit signal for indicating inhibition or permission of a video signal duplication. For description, the anti-duplication control signal is described as a signal added in the video signal.

As shown in FIG. 1, the playback device 10 of in this embodiment comprises a read-out section 11, decoding section 12, anti-duplication control signal extracting section 13, sync separation section 14, PNcode generation section 15, spectrally spread anti-duplication control signal generation section 16 (referred to as SS (SS is an abbreviation of spectral spreading) anti-duplication control signal generator hereinafter), addition section 17, and D/A conversion circuits 191 and 192.

The read-out unit 11 extracts a playback video signal component S2 from the signal S1 obtained by playing back the recording medium 100, and supplies it to the decoding section 12 and anti-duplication control signal extraction section 13.

The decoding section 12 demodulates the playback video signal component S2, generates a digital video signal, and supplies it to the D/A conversion circuit 191. The D/A conversion circuit 191 performs D/A conversion of the digital video signal to generate an analog video signal S2A comprising a sync signal, and supplies the result to the sync separator 14 and addition section 17.

The anti-duplication control signal extraction section 13 extracts an anti-duplication control signal S3 added to the playback video signal component S2, and the extracted anti-duplication control signal S3 is supplied to the SS anti-duplication control signal generation section 16.

The sync separation section 14 removes a video sync signal S4 from the analog video signal S2A, and supplies the result to the PN code generation section 15. According to this embodiment, a vertical sync signal is used as the video sync signal S4.

The PN code generator 15 generates a PN code (spread code) using the vertical sync signal S4 as a reference and forms various timing signals to be used in other processors. In detail, the PN code generation section 15 functions as a spread code generation means for generating a spread code for spectral spreading.

Figure 3:
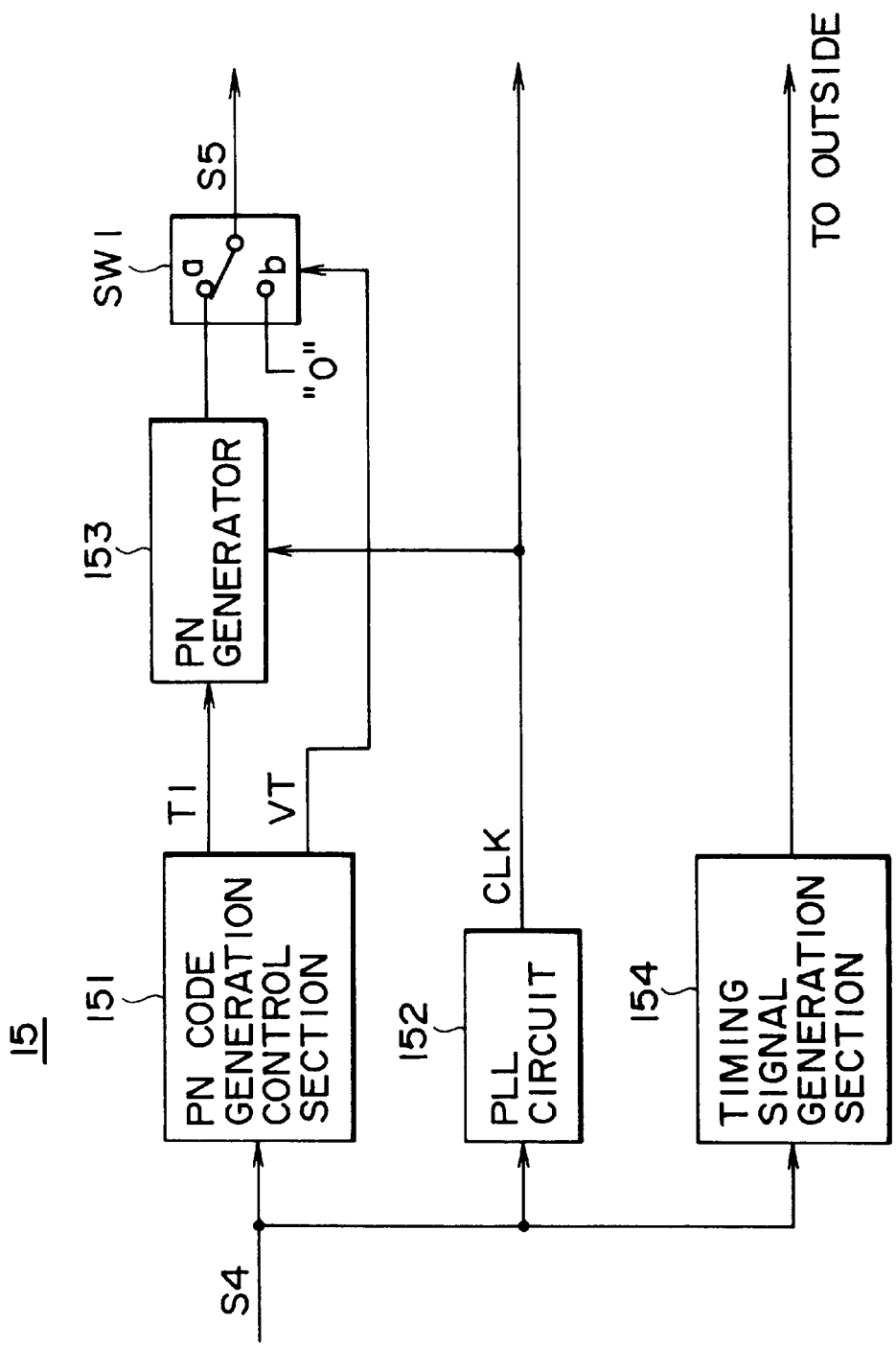
FIG. 3 is a block diagram for illustrating one example of the PN code generation section of the video signal output device shown in FIG. 1.

FIG. 3 is a block diagram for describing the PN code generation section 15 of the output device 10 used in this embodiment. FIGS. 4A to 4D are diagrams for describing a PN code string S5 generated in the PN code generating section 15.

As shown in FIG. 3, the PN code generation section 15 comprises a PN code generation control section 151, PLL circuit 152, PN code generator 153, and timing signal generation section 154. The vertical sync signal S4 extracted in the sync separator 14 is supplied to the PN code generator 151 of the PN code generation section 15, the PLL circuit 152, and the timing signal generation section 154.

Figure 4:
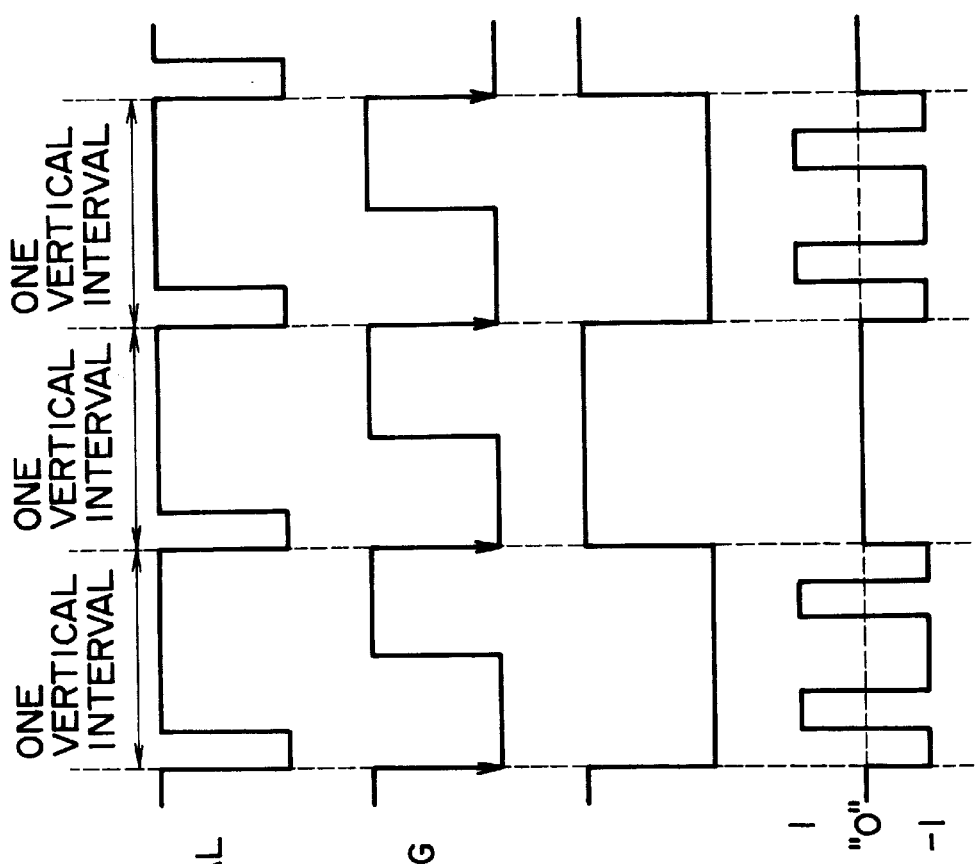
FIGS. 4A to 4D are diagrams for describing one example of the PN code string generated in the video signal output device shown in FIG. 1.

The PN code generation control section 151 generates a PN code start timing signal Tl (FIG. 4B) which indicates a timing for starting generation of a PN code string in synchronizing with the vertical sync signal S4 (FIG. 4A). In this embodiment, the PN code start timing signal Tl is generated with reference to the front edge of the vertical sync signal S4, and indicates the timing at which generation of a PN code string which repeats every one vertical interval is started.

The PN code generation control section 151 generates a PN code generation control signal VT (FIG. 4C) for indicating vertical intervals where PN code strings are to be generated and vertical intervals where PN code strings are not to be generated. The PN code generation control signal VT is a signal for controlling a switch circuit SW1 which will be described hereinafter.

In this embodiment, the PN code generation control signal VT is a signal having a low level interval or high level interval which are alternating every one vertical interval with reference to the front edge of the vertical sync signal S4 as shown in FIG. 4C.

The PN code start timing signal T1 generated in the PN code generation control section 151 is supplied to the PN code generator 153, and the PN code generation control signal VT is supplied to the switch circuit SW1.

The PLL circuit 152 generates a clock signal CLK based on the vertical sync signal S4 supplied to it, and the clock signal is supplied to the PN code generator 153. The PLL circuit 152 in this embodiment generates a clock signal CLK having a frequency of, for example, 1 MHz as described hereinafter.

The PN code generator 153 determines PN code string generation start timing based on the PN code start timing signal T1, and also generates a PNcode corresponding to the clock signal CLK, and supplies it to the input terminal of the switch circuit SW1.

FIG. 5 is a diagram for illustrating one example of the PN code generator 153. The PN code generator shown in FIG. 5 comprises 12 D-flip-flops REG1 to REG12 and three exclusive-OR circuits EX-OR1 to EX-OR3. As shown in FIG. 5, upon receiving supply of a PN code start timing signal T1 used as a reset signal, clock signal CLK, and enable signal EN, the PN code generator 153 in this example generates a PN code having 4095 chips per one vertical interval.

In this case as described hereinbefore, the clock rate of 250 kHz gives one period of a PN code string of 4095/250= 16.38 ms, and a PN code having 4095 chips is generated in an approximate one vertical interval (16.7 ms). By using the PN code start timing signal T1 as a reset signal, a PN code string having a pre-determined code pattern is generated from its head every one vertical interval. In other words, a PN code string which repeats every one vertical interval is generated.

In this embodiment, the PN code generator 153 generates M series codes in which codes [1] and [0] appear randomly without deviation, and converts a generated code level [0] to [−1] to generates a PN code string composed of codes [1] and [−1].

The switch circuit SW1 is provided with two input terminals-a and -b as shown in FIG. 3. To the input terminal-a, the PN code string generated by the PN code generator 153 as described herein above is supplied, and on the other hand, 0 level signal that is the median value of the PN code string composed of 1 and −1 is supplied to the other input terminal-b.

The switch SW1 is controlled correspondingly to the PN code generation control signal VT output from the PN code generation control section 151, switched to the input terminal-a side correspondingly to the trailing edge of a PN code generation control signal VT, and switched to the input terminal-b side correspondingly to the leading edge of a PN code generation control signal VT.

From the switch circuit SW1, as shown in FIG. 4D, the PN code string is thereby output every one vertical interval, and 0 level signals are output in vertical intervals in which a PN code string is not output, as the result, the PN code string S5 is generated.

In detail, the switch SW1 outputs a PN code string output from the PN code generator 153 in low level intervals of the PN code generation control signal VT and outputs a 0 level signal in high level intervals of the PN code generation control signal VT, thereby the PN code string is generated intermittently every second vertical interval with respect to the video signal. The PN code string S5 output from the switch circuit SW1 is supplied to the SS anti-duplication control signal generation section 16.

The timing signal generation section 154 generates various timing signals based on the vertical sync signal S4 and outputs it.

The SS anti-duplication control signal generation section 16 generates a spectrally spread anti-duplication control signal S6 by spectrally spreading the anti-duplication control signal using the PN code string S5, and supplies it to the D/A conversion circuit 192. The D/A conversion circuit 192 converts the spectrally spread signal S6 to an analog spectrally spread signal S6A and supplies it to the addition section 17.

The addition section 17 superimposes the analog spectrally spread signal S6A on the analog video signal S2A to generate an output video signal S7A, and outputs it. As described herein above, the addition section 17 functions as a superimposition means for superimposing a spectral spread signal S6A that is the spectrally spread anti-duplication control signal using the PN code string S5.

The analog output video signal S7A on which the spectrally spread anti-duplication control signal is superimposed is supplied to a monitor receiver for displaying a video image or a recording device 20 which will be described hereinafter.

Figure 6A:
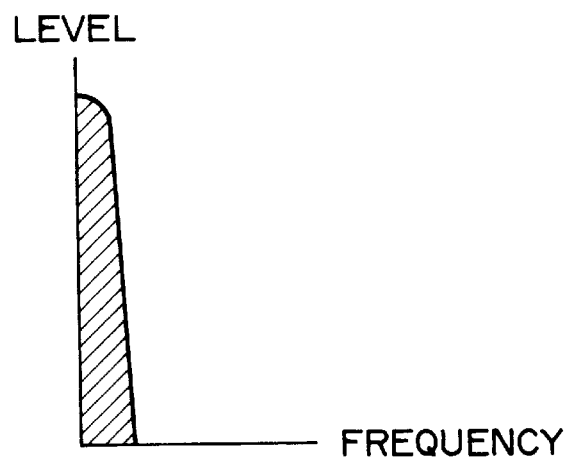
FIGS. 6A to 6D are diagrams for describing the relation between the SS anti-duplication control signal and information signal in the form of spectrum.
Figure 6B:
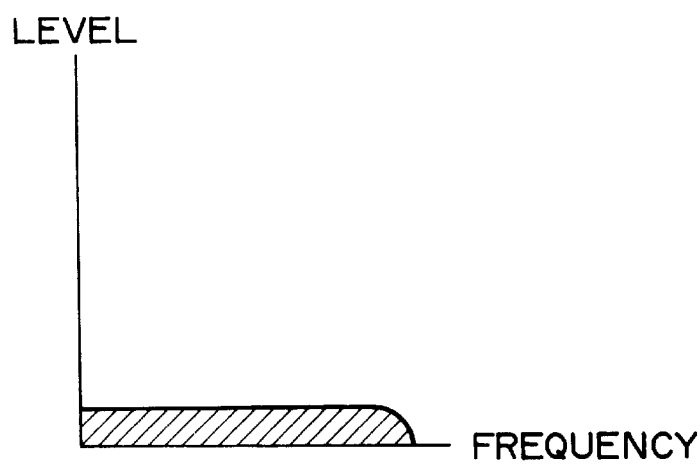

FIGS. 6A to 6D show a relation between the anti-duplication control signal and main information signal, video signal in this example, in the form of spectrum. The anti-duplication control signal contains not so much information, and is a low bit rate signal having a narrow band as shown in FIG. 6A. The anti-duplication control signal is changed by performing spectral spreading to a signal having a wide band as shown in FIG. 6B, and the spectral spread signal level becomes low in inverse proportion to the enlargement ratio of the band.

Figure 6C:
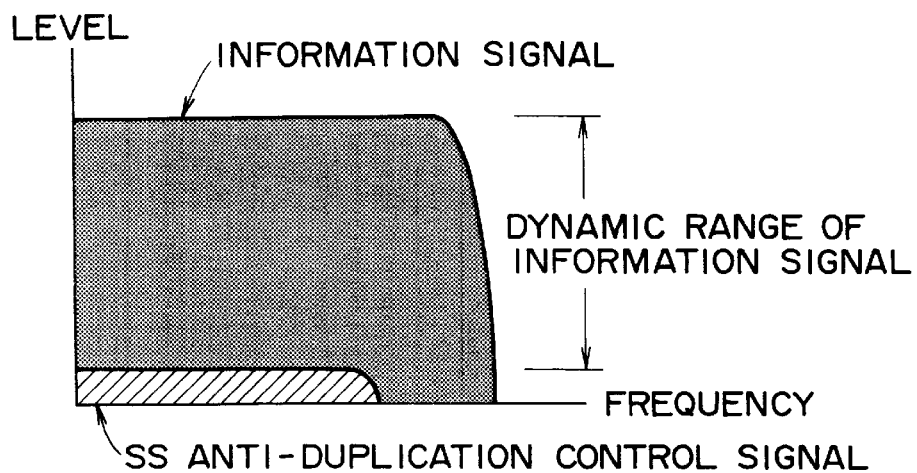

When the spectral spread signal or SS anti-duplication control signal S6A is superimposed on an information signal in the addition section 17, the SS anti-duplication control signal S6A is superimposed with a level smaller than that of the dynamic range of the video signal that is an information signal as shown in FIG. 6C. Such superimposition prevents the main information signal from being deteriorated. Hence, when the video signal on which the SS anti-duplication control signal is superimposed is supplied to a monitor receiver to playback an image, the SS anti-duplication control signal does not affect adversely and a good playback image is obtained.

Figure 6D:
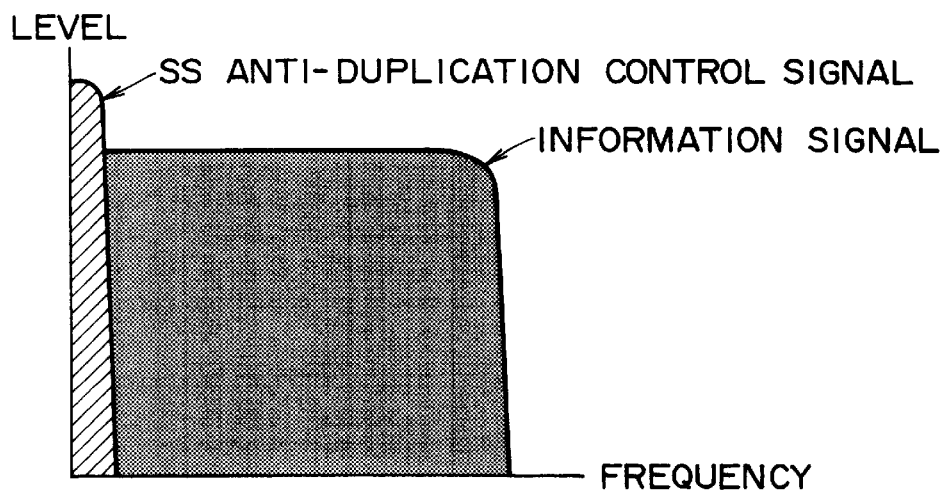

On the other hand, when inversion spectral spread is performed to detect the SS anti-duplication control signal on the recording side as described hereinafter, the SS anti-duplication control signal is restored again as a signal having a narrow band as shown in FIG. 6D. By giving a sufficient band enlargement ratio, the power of the anti-duplication control signal after inversion spreading exceeds that of the information signal, and it becomes possible to detect the anti-duplication control signal.

In this case, it is impossible to remove or alter the anti-duplication control signal by way of simple replacement of a frequency filter or information, because the SS anti-duplication control signal is superimposed on the analog video signal superimposed in the same time and same frequency as those of the analog video signal.

Therefore, the SS anti-duplication control signal superimposed on a video signal will not be removed, and the SS anti-duplication control signal is provided consistently to a device such as monitor receiver or recording device.

Next, the recording device 20 which receives supply of the video signal S7A from the above-mentioned output device 10 and records the video signal is described. The recording device 20 of this embodiment is provided with a coding section 21, sync separation section 22, PN code generation section 23, PN code inversion section 24, detection section 25 for detecting the spectrally spread anti-duplication control signal superimposed on the video signal (referred to as SS anti-duplication control signal detection section hereinafter), duplication control section 26 for controlling duplication control such as permission or inhibition, write section 27, and A/D conversion circuit 291, as shown in FIG. 2. The recording medium 200 is a DVD on which the video signal is written by the recording device 20.

The video signal S7A supplied from the output device 10 is converted to a digital video signal S8 by the A/D conversion circuit 291 and the resultant signal is supplied to the coding section 21, sync separation section 22, and SS anti-duplication control signal detection section 25.

The coding section 21 receives supply of the digital video signal S8, and performs coding processing such as removal of the video sync signal and data compression of the digital video signal to generate a digital video signal S9 for supplying and recording on the recording medium 200, and the digital video signal S9 is supplied to the write section 27.

The sync separation section 22 extracts the video sync signal S11 from the digital video signal S8 before coding processing, and supplies it to the PN code generation section 23. In the recording device 20 of this embodiment, a vertical sync signal is used as the video sync signal S11 corresponding to the above-mentioned output device 10.

The PN code generation section 23 generates a PN code as the spread code based on the vertical sync signal S11, and generates various timing signals used by other processing sections.

FIG. 7 is a block diagram for illustrating the PN code generation section 23 of the recording device 20 of this embodiment, and FIGS. 8A to 8D are diagrams for describing the PN code start timing signal T2, PN code inversion control signal VT2, and PN inversion code S13 generated by the PN code inversion section 24.

As shown in FIG. 7, the PN code generation section 23 is provided with a PN code generation control section 231, PLL circuit 232, PN code generator 233, and timing signal generation section 234. Though the PN code generation section 23 is a section for generating the PN code string and various timing signals like the PN code generation section 15 of the above-mentioned output device 10 shown in FIG. 3, this section 23 is different from the PN code generation section 15 of the output device 10 in that the switch circuit SW1 is not provided.

The PN code generation control section 231 generates a PN code start timing signal T2 (FIG. 8B) which indicates timing for starting generation of a PN code string based on the vertical sync signal S11 (FIG. 8A). In this embodiment, the PN code start timing signal T2 is generated with reference to the front edge of the vertical sync signal S11. The PN code start timing signal T2 indicates PN code string generation start timing which repeats every one vertical interval.

The PLL circuit 232 generates a clock signal CLK 2 with reference to the vertical sync signal S11 supplied to the PLL circuit 232, and supplies it to the PN code generator 233. The PLL circuit 232 of this embodiment generates a clock signal CLK 2 of, for example, frequency of 250 kHz like the PLL circuit 152 of the PN code generation section 15 of the above-mentioned output device 10.

The PN code generator 233 determines PN code generation start timing based on the PN code start timing signal T2, and generates a PN code corresponding to the clock signal CLK 2 and outputs it. Further, the PN code generator 233 has the same structure as that of the above-mentioned PN code generator 153 shown in FIG. 5.

The PN code generator 233 generates a PN code S12 using the PN code start timing signal T2 and clock signal CLK 2. Thereby, generation of the PN code string S12 is started at the same start timing as that of the PN code string S5 with respect to the video signal supplied to the recording device 20 which PN code string S5 is generated in the output device 10.

In this embodiment, the PN code string S12 is a string that is the PN code string of one period generated from the head every one vertical interval like the PN code string used for spectrally spreading the anti-duplication control signal in the above-mentioned output device 10.

The timing signal generation section 234 of the PN code generation section 23 generates a PN code inversion control signal VT2 (FIG. 8C) used in the PN code inversion section 24 and outputs it. In this embodiment, the PN code inversion control signal VT2 is a signal for inverting every one vertical interval.

As described herein above, the PN code string S12 and PN code inversion control signal VT2 generated in the PN code generation control section 23 are supplied to the PN code inversion section 24.

The PN code inversion section 24 inverts the polarity of the PN code string S12 supplied from the PN code generation section 23 every one vertical interval based on the PN code inversion control signal VT2 to generates a PN inversion code S13 (FIG. 8D).

In detail, the PN code inversion section 24 outputs the supplied PN code string S12 as it is in the low level interval of the PN code inversion control signal VT2, and on the other hand, in the high level interval of the PN code inversion control signal VT2, the PN code inversion section 24 inverts the polarity of the supplied PN code string S12. As the result as shown in FIG. 8D, a PN inversion code S13 having the different polarity alternating every one vertical interval is generated.

Herein, the polarity inversion means inversion from a PN code of 1 to a PN code of −1 and inversion from a PN code of −1 to a PN code of 1, and in this embodiment, the PN inversion code S13 is generated by outputting all the PN code strings in one vertical interval or by inverting the polarity of all the PN code string in one vertical interval by the PN code inversion section 24. The generated PN inversion code S13 is supplied to the SS anti-duplication control signal detection section 25 as an inversion spreading PN code string S13 used for inversion spectral spreading.

The SS anti-duplication control signal detection section 25 functions as an inversion spectral spreading processing means, and the function allows the SS anti-duplication control signal detection section 25 to extract the spectrally spread anti-duplication control signal superimposed on the video signal S8 by performing inversion spectral spreading using the PN inversion code S13 as a reference signal, and the SS anti-duplication control signal detection section 25 supplies it to the duplication control section 26 as the anti-duplication control signal S14.

When inversion spectral spreading is performed in the SS anti-duplication control signal detection section, as described hereinbefore, the video signal S8 containing the spectrally spread anti-duplication control signal is multiplied by the PN inversion code S13, and the result is integrated to extract the anti-duplication control signal superimposed on the video signal S8. While inversion spectral spreading, the polarity of the video signal S8 is inverted every one vertical interval by multiplying the PN inversion code S13.

The video signal is a correlative signal between adjacent fields. Therefore, the video signal component having different polarity repeating every one vertical interval is canceled and offset by integration during inverse spectral spreading. Thus, the anti-duplication control signal superimposed on the video signal is effectively extracted without adverse effect of high level video signals.

The anti-duplication control signal S14 extracted by the SS anti-duplication control signal detection section 25 as described herein above is supplied to the duplication control section 26.

The duplication control section 26 decodes the anti-duplication control signal S14 and judges whether the video signal S7A supplied to the recording device 20 is a duplication permit signal or a duplication inhibition signal. Based on the judgement result, the duplication control section 26 generates a write control signal S15 and supplies it to the write section 27 to perform duplication control of the video signal S9. Thus the selection whether writing is permitted or not permitted is performed.

The write section 27 writes the video signal S9 on the recording medium 200 if the write control signal S15 is a signal for permitting writing, and on the other hand, the write section 27 does not write the video signal S9 on the recording medium 200 if the write control signal S15 is a signal for inhibiting writing.

As described herein above, in the video signal duplication control system comprising the output device 10 and recording device 20 of this embodiment, by starting generation of the PN code string every one vertical interval based on the vertical sync signal, generation of the PN code string is started at the same timing as that of the video sync signal in both the output device 10 and recording device 20.

Further, in the output device 10, the anti-duplication control signal is spectrally spread using the PN code string S5 generated every one vertical interval with respect to the video signal, and the resultant signal is superimposed on the video signal. In other words, the spectrally spread anti-duplication control signal is superimposed and output every second vertical interval of the video signal.

In the recording device 20, correspondingly to the video signal output from the output device 10, the PN inversion code S13 having the same PN code string S12 as the PN code string S5 used in spectral spreading is generated for the vertical interval on which the spectral spread signal S6A is superimposed, on the other hand, the PN inversion code S13 having the PN code string having opposite polarity to that of the PN code string S12 is generated for the vertical interval on which the spectral spread signal S6A is not superimposed, and inversion spectral spreading is performed using this PN inversion code.

Therefore, the same PN code string as the PN code string used for spectral spreading is multiplied for the vertical interval on which the spectral spread code is superimposed in inversion spectral spreading, on the other hand, the PN code string having opposite polarity to that of the same PN code string as used for spectral spreading is multiplied for the vertical interval on which the spectral spread signal is not superimposed, and the result is integrated.

In this case, the video signal component of adjacent vertical intervals is canceled by integration during inversion spectral spreading. Therefore, only the anti-duplication control signal superimposed on the video signal as a spectral spread signal is extracted. The anti-duplication control signal superimposed on the video signal is extracted without adverse effect of high level video signals.

Inversion spectral spreading is thereby performed rapidly and correctly, and thus detection efficiency of the spectrally spread anti-duplication control signal superimposed on the video signal is improved and spread gain of the anti-duplication control signal is reduced.

As described hereinbefore, in the output device 10 of this embodiment, the PN code string is generated every second vertical interval with reference to the front edge of the vertical sync signal (FIG. 9A) by using the PN code generation control signal VT which is inverted every vertical interval as shown in FIG. 9B, and by spectrally spreading the anti-duplication control signal using this PN code string, the anti-duplication control signal which is spectrally spread every second vertical interval is superimposed on the video signal. However, the present invention is by no means limited to the above-mentioned case.

For example, as shown in FIG. 9C, a signal having the phase opposite to that of the PN code generation control signal VT shown in FIG. 9B may be used. In this case, the spectrally spread anti-duplication control signal may be superimposed on either odd field or even field of the video signal.

Alternatively, as shown in FIGS. 9D and 9E, by generating the PN code string every two vertical intervals (one frame), the spectrally spread anti-duplication control signal may be superimposed on the video signal every two vertical intervals (one frame).

The present invention is by no means limited to the case that the PN code string used for spectral spreading is generated every second vertical interval or every third vertical interval. However, the PN code string may be generated every integral multiple of one vertical interval such as every fourth vertical interval or every fifth vertical interval.

In general, the video signal interval on which the anti-duplication control signal is superimposed and the video signal interval on which the anti-duplication control signal is not superimposed may be prescribed so that the video signal of both video signal intervals is sufficiently correlative to cancel the video signal of both video signal intervals by calculating the difference between the video signal in the video signal interval on which the spectrally spread anti-duplication control signal is superimposed and the video signal in the adjacent video signal interval on which the spectrally spread anti-duplication control signal is not superimposed.

Further, in the recording device 20 correspondingly to the output device 10, the same PN code string as the PN code used for spectrally spreading the anti-duplication control signal in the output device is generated in the video signal interval on which the spectrally spread anti-duplication control signal is superimposed, on the other hand, the PN code string having the opposite polarity to that of the PN code string used for spectral spreading is generated in the video signal interval on which the spectrally spread anti-duplication control signal is not superimposed which is adjacent to the video signal interval on which the spectrally spread anti-duplication control signal is superimposed.

In the above-mentioned embodiment, in the output device 10 and recording device 20, the PN code string is generated at the timing synchronous with the vertical sync signal using the vertical sync signal as the reference signal. However, the reference signal is by no means limited to the vertical sync signal, and the horizontal sync signal may be used as the reference signal.

In the case that the horizontal sync signal is used as described herein above, in the output device 10, the PN code string used for spectral spreading may be generated every integral multiple of one horizontal interval such as every second horizontal interval, every third horizontal interval, or every fourth horizontal interval.

Further in this case, in the recording device 20, the PN code string is generated every integral multiple of one horizontal interval such as every second horizontal interval, every third horizontal interval, or every fourth horizontal interval correspondingly to the output device 10, and the polarity of the generated PN code string is inverted in the interval on which the anti-duplication control signal is not superimposed.

Further, in the above-mentioned embodiment, the PN code string which repeats every vertical interval is generated every second vertical interval, and the anti-duplication control signal is spectrally spread using this PN code string, and the spectrally spread anti-duplication control signal is superimposed every second vertical interval on the video signal. However, the present invention is by no means limited to the case.

For example, the PN code string is generated every one vertical interval, the anti-duplication control signal is spectrally spread every second horizontal interval using this PN code string, and the anti-duplication control signal may be superimposed every second horizontal interval on the video signal.

For example, FIGS. 10A to 10C are diagrams for describing an example of a case that the anti-duplication control signal is spectrally spread using the PN code string which repeats every one vertical interval, and the spectrally spread anti-duplication control signal is superimposed every second horizontal interval.

In detail, in the PN code generation section 15 of the output device 10, the PN code string used for spectral spreading is generated, for example, every one vertical interval. The PN code generation control signal HT (FIG. 10B) which is inverted every one horizontal interval is generated based on the horizontal sync signal (FIG. 10A). Based on the PN code generation control signal HT, the switch circuit SW1 of the PN code generation section 15 described using FIG. 3 is controlled to output the PN code from the PN code generator 153 every second horizontal interval and is controlled to output 0 level signal in the horizontal interval where the PN code is not output.

As the result, the PN code string is generated every second horizontal interval as shown in FIG. 10C. The anti-duplication control signal is spectrally spread using the PN code string shown in FIGS. 10A to 10C, and the spectrally spread anti-duplication control signal is superimposed every one horizontal interval of the video signal.

FIGS. 11A to 11C are diagrams for describing the processing in the recording device 20 in this case. In detail, in the recording device 20 like the output device 10, the PN code string which repeats every one vertical interval is generated, and also the PN code inversion control signal HT2 which is inverted every one horizontal interval is generated based on the horizontal sync signal (FIG. 11A) as shown in FIGS. 11A to 11C.

Based on the PN code inversion control signal HT2, the PN code string having the polarity opposite to the PN code string generated in the horizontal interval on which the spectrally spread anti-duplication control signal is superimposed is generated as shown in FIG. 11C.

In the case that inversion spectral spreading is performed using the PN code string which is inverted every one horizontal interval as described herein above, by integration during inversion spectral spreading, the video signal component is canceled due to correlation between horizontal scanning lines as in the case of the above-mentioned embodiment, and the anti-duplication control signal superimposed every second horizontal interval is detected efficiently.

Further, the start timing of PN code string generation is not limited to the case of every one vertical interval, and may be every plurality of vertical intervals or every horizontal intervals. In sum, the PN code is generated at the same timing as that of the video signal in the output device 10 and recording device 20.

Further, the video signal interval on which the spectrally spread anti-duplication control signal is superimposed is by no means limited to the case of every second horizontal interval, for example, the anti-duplication control signal may be superimposed every second pixel on the video signal.

Further, in the output device 10 of the above-mentioned embodiment, the spectrally spread anti-duplication control signal is superimposed over one vertical interval or one horizontal interval as shown in FIGS. 4A to 4D and FIG. 10A to 10C. However, the present invention is by no means limited to the case.

For example, one vertical interval is divided into a plurality of sub-intervals, and the anti-duplication control signal spectrally spread on one divided sub-interval or on a plurality of divided sub-intervals may be superimposed.

FIGS. 12A to 12D are diagrams for describing an example of the case that one vertical interval is divided into two sub-intervals and the spectrally spread anti-duplication control signal is superimposed on one sub-interval in the above-mentioned output device 10.

In this case, the output device 10 generates the PN code start timing signal T1 for generating the PN code string, for example, every one vertical interval with reference to the front edge of the vertical sync signal (FIG. 12A), and also generates the PN code generation control signal VT for generating the PN code string during ½ vertical interval every second vertical interval as shown in FIG. 12C.

As the result in the output device 10, the PN code string S5 is generated so that the PN code string is generated during ½ vertical interval every second vertical interval as shown in FIG. 12D, and the level is 0 in other intervals. The anti-duplication control signal is spectrally spread using this PN code string S5 (FIG. 12D), the spectrally spread anti-duplication control signal is superimposed on ½ vertical interval repeating every second vertical interval.

FIGS. 13A to 13D are diagrams for describing the processing in the recording device 20 which receives supply of the anti-duplication control signal spectrally spread during ½ vertical interval repeating every second vertical interval.

The recording device 20 generates the PN code start timing signal T2 for generating the PN code string every one vertical interval based on the front edge of the vertical sync signal (FIG. 13A) like the output device 10. In addition, the recording device 20 generates the PN code inversion control signal VT2 for inverting the polarity of the generated PN code string every one vertical interval.

As the result, in the recording device 20, the PN code string having the same code pattern as that of the output device 10 is generated based on the PN code timing signal T2. In the case of this example, when the PN code string corresponding to ½ vertical interval, generation of the PN code stops, generation of the PN code string re-starts correspondingly to rising of the next PN code start timing signal, and by repeating stop and re-start, the PN code string corresponding to ½ vertical interval is generated every one vertical interval.

The recording device 20 inverts every one vertical interval the polarity of the PN code string generated every one vertical interval based on the PN code inversion control signal VT2. The PN inversion code S13 having the polarity inverted every one vertical interval is thereby generated.

By performing inversion spectral spreading using this PN inversion code S13 and by integration during inversion spectral spreading, the video signal component of ½ vertical interval of the field on which the anti-duplication control signal is superimposed and the video signal component of adjacent ½ vertical interval of the field on which the anti-duplication control signal is not superimposed cancel each other.

Accordingly, also in this case, the anti-duplication control signal superimposed on the video signal is extracted efficiently because the video signal component is canceled between highly correlative fields.

As described herein above, the spectrally spread anti-duplication control signal is superimposed on the video signal interval, in this case, the predetermined interval in the field such as ½ vertical interval or ⅓ vertical interval. The anti-duplication control signal is not superimposed on the interval corresponding to the video signal interval which is highly correlative to this video signal interval (field), and output.

In the recording device side, the same PN code string as the PN code string used for spectral spreading is generated for the interval on which the spectrally spread anti-duplication control signal is superimposed, on the other hand, the PN code string having the polarity opposite to that of the PN code string used for spectral spreading is generated for the interval corresponding to the video signal interval on which the anti-duplication control signal having a correlation to the video signal interval is not superimposed, and inversion spectral spreading may be performed using the inversion spreading PN code having the inverted polarity.

Alternatively, one horizontal interval is divided into a plurality of sub-intervals, and the spectrally spread anti-duplication control signal may be superimposed on one divided sub-interval or a plurality of divided sub-intervals out of divided sub-intervals. Also in this case, the spectrally spread anti-duplication control signal is superimposed on the predetermined interval in the one horizontal interval (one line) and the anti-duplication control signal is not superimposed on the interval corresponding to the line correlative to the predetermined interval, in the output device like the case of the above-mentioned one vertical interval (one field).

In the recording device, the inversion spreading PN code having different polarity may be used as described herein above dependently on the type of the interval, whether it is an interval on which the anti-duplication control signal is superimposed or it is the correlative horizontal interval on which the anti-duplication control signal is not superimposed.

Second Embodiment

Next, the second embodiment of the video signal duplication control system comprising a video signal output device and video signal recording device in accordance with the present invention will be described herein after.

In the second embodiment, by removing the video signal component before inversion spectral spreading is performed in the recording device, only the spectrally spread anti-duplication control signal component superimposed on the video signal is extracted, the resultant signal is subjected to inversion spectral spreading, and thereby, the anti-duplication control signal superimposed on the video signal is extracted rapidly and correctly.

In the second embodiment, the same output device as the output device 10 used in the first embodiment described using FIG. 1 is used. Therefore, the output device 10 in the second embodiment spectrally spreads the anti-duplication control signal read out from the recording medium 100 using the PN code string generated every second vertical interval, and superimposes the spectrally spread anti-duplication control signal on the video signal played back from the recording medium 100 every second vertical interval, and outputs it.

Figure 14:
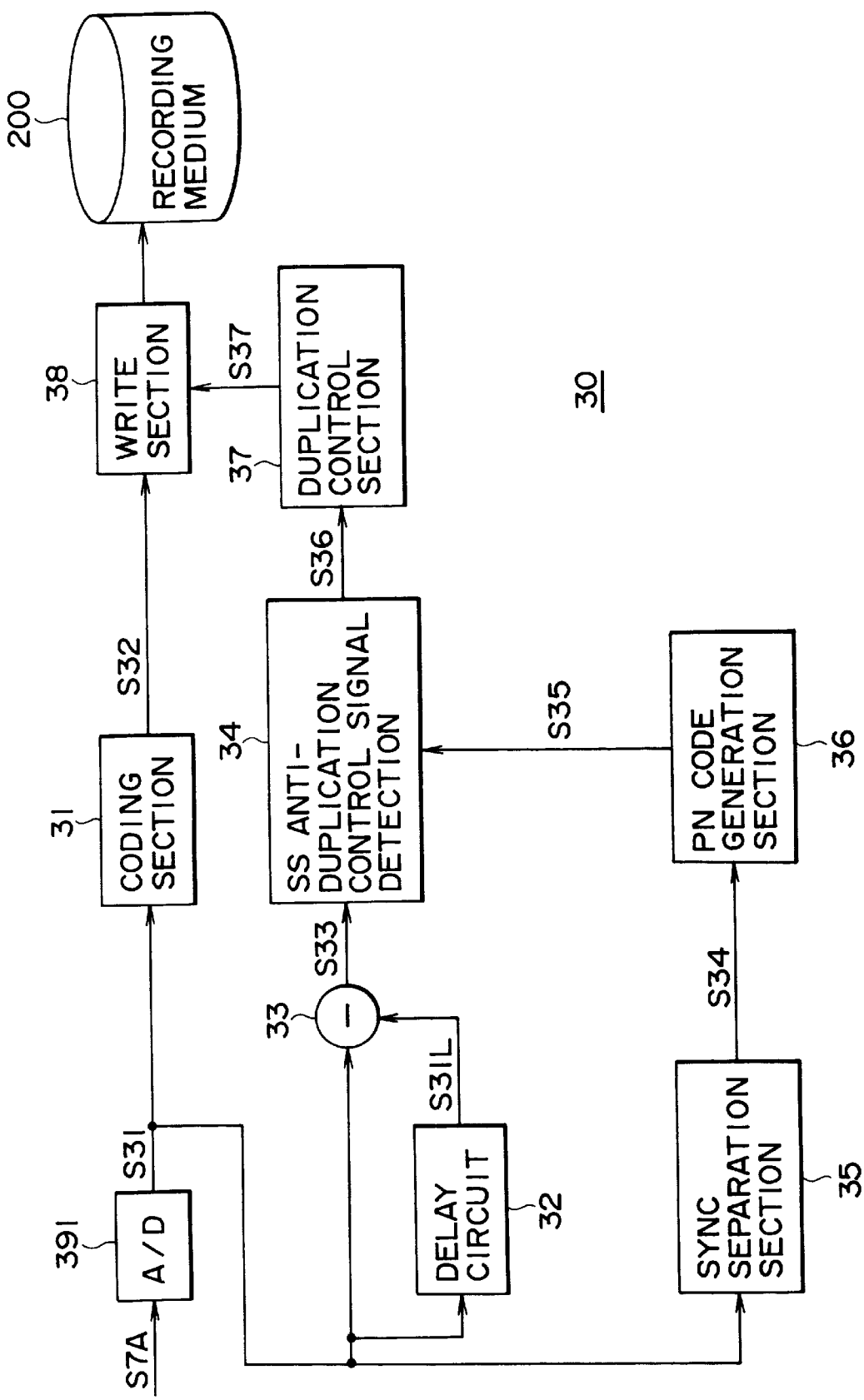
FIG. 14 is a block diagram for illustrating another example of one embodiment of the video signal recording device in accordance with the present invention.

FIG. 14 is a block diagram for illustrating a recording device 30 used in the second embodiment. The recording device 30 receives a video signal output from the output device 10 used in this embodiment and records the video signal on the recording medium 200.

The recording device 30 of the second embodiment is provided with a coding section 31, delay circuit 32, subtraction section 33, SS anti-duplication control signal detection section 34, sync separation section 35, PN code generation section 36, duplication control section 37, write section 38, and A/D conversion circuit 391 as shown in FIG. 14.

The video signal S7A supplied from the output device 10 is subjected to A/D conversion through the A/D conversion circuit 391 and the digital video signal S31 is supplied to the coding section 31, delay circuit 32, subtraction section 33, and sync separation section 35.

The coding section 31 receives the digital video signal S31, and then removes the sync signal and performs coding processing such as data compression of the digital video signal to generate a recording digital video signal S32, and supplies it to the write section 38.

In the second embodiment, the delay circuit 32 delays the supplied digital video signal S31 by one vertical interval and supplies it to the subtraction section 33. The subtraction section 33 subtracts the digital video signal S31 from the one vertical interval-delayed digital video signal S31L from the delay circuit 32 to output the spectrally spread anti-duplication control signal superimposed on the digital video signal.

In detail, on the video signal supplied from the output device 10, the anti-duplication control signal spectrally spread using the PN code string generated every second vertical interval as shown in FIG. 4D is superimposed every second vertical interval. Hence, in this embodiment, the video signal in the vertical interval on which the anti-duplication control signal spectrally spread is superimposed and is delayed by delaying the video signal S31 by one vertical interval by means of the delay circuit 32 is supplied to the subtraction section 33 through the delay circuit 32.

At the same time, to the subtraction section 33, the video signal in the vertical interval on which the spectrally spread anti-duplication control signal is not superimposed subsequent to the vertical interval on which the spectrally spread anti-duplication control signal is superimposed is supplied from the A/D conversion circuit 391.

As described hereinbefore, the video signal is highly correlative between adjacent fields. Therefore, by subtracting the video signal in the vertical interval on which the anti-duplication control signal is not superimposed from the video signal in the preceding vertical interval on which the spectrally spread anti-duplication control signal is superimposed, the video signal component is offset, and the spectrally spread anti-duplication control signal component S33 is supplied to the SS anti-duplication control signal detection section 34.

However, in the case that the video signal delayed by one vertical interval by means of the delay circuit 32 is subtracted from the video signal in the subsequent vertical interval successively, the video signal on which the spectrally spread anti-duplication control signal is superimposed is inevitably subtracted from the video signal on which the spectrally spread anti-duplication control signal is not superimposed. In this case, such subtraction is not preferable because the spectrally spread anti-duplication control signal component having the inverted polarity is inevitably calculated.

To cope with this problem, the delay circuit 32 of the second embodiment delays only the video signal in the vertical interval on which the spectrally spread anti-duplication control signal is superimposed by one vertical interval. In the subtraction section 33, the video signal component in the vertical interval on which the anti-duplication control signal is superimposed is offset by the video signal component in the subsequent vertical interval on which the anti-duplication control signal is not superimposed, and the video signal component is removed, then the spectrally spread anti-duplication control signal component is output.

On the other hand, receiving supply of the A/D converted video signal S31, the sync separation section 35 extracts the vertical sync signal S34 contained in the video signal S31 and supplies it to the PN code generation section 36.

The PN code generation section 36 has the same structure as the PN code generation section 23 of the recording device 20 described hereinbefore. The PN code generation section 36 of the second embodiment generates the same PN code string S35 as the PN code string used for spectral spreading in the output device 10 corresponding to the clock signal generated based on the vertical sync signal S34 every one vertical interval with reference to the vertical sync signal S34. The PN code string S35 is supplied to the SS anti-duplication control signal detection section 34 as an inversion spreading PN code string.

By performing inversion spectral spreading on the spectrally spread anti-duplication control signal component S33 supplied from the subtraction section 33 using the inversion spreading PN code string S35, the SS anti-duplication control signal detection section 34 extracts the anti-duplication control signal S36 and supplies it to the duplication control section 37.

The duplication control section 37 generates the control signal S37 for controlling writing of the video signal S32 on the recording medium 200 depending on the anti-duplication control signal S36 like the duplication control section 26 of the recording device 20 described hereinbefore, and supplies it to the write section 38.

The write section 38 writes the video signal S32 on the recording medium 200 if the control signal S37 generated depending on the anti-duplication control signal S36 is a signal for indicating permission of writing, and on the other hand, the write section 38 does not write the video signal S32 on the recording medium 200 if the control signal S37 is a signal for indicating inhibition of writing.

As described herein above, in the recording device 30 of the second embodiment, the anti-duplication control signal superimposed on the video signal can be extracted without adverse effect of high level video signal components like the above-mentioned first embodiment, because the video signal component in adjacent vertical intervals which are highly correlative is removed. Thereby, inversion spectral spreading is performed correctly and rapidly, the detection efficiency of the spectrally spread anti-duplication control signal superimposed on the video signal is improved, and the spread gain of the anti-duplication control signal is reduced.

The output device 10 of the second embodiment may generate the PN code string used for spectral spreading every integral multiple of vertical interval such as every second vertical interval, every third vertical interval, or every fourth vertical interval.

In this case, in the recording device 30, the video signal to be supplied to the subtraction section 34 may be delayed by means of the delay circuit 32 by the video signal interval on which the video signal is superimposed correspondingly to the output device 10. Further, in this case, only the video signal in the video signal interval on which the anti-duplication control signal is superimposed may be delayed.

Further, in the output device 10 and recording device 30 of the second embodiment, the horizontal sync signal may be used as the reference signal instead of the vertical sync signal as in the output device 10 and recording device 20 in the first embodiment described hereinbefore.

In the case that the horizontal sync signal is used as described herein above, in the output device 10, the PN code string used for spectral spreading may be generated every integral multiple of horizontal interval as in the case that the vertical sync signal is used.

Further, in the recording device 30, corresponding to the output device 10 used in the second embodiment, the video signal on which the anti-duplication control signal is superimposed may be delayed by integral multiple of one horizontal interval.

For example, one vertical interval is divided into a plurality of sub-intervals, and the spectrally spread anti-duplication control signal may be superimposed on one divided sub-interval or a plurality of divided sub-intervals out of the divided sub-intervals as in the first embodiment described hereinbefore.

For example, the spectrally spread anti-duplication control signal may be superimposed on the video signal interval, in this case the predetermined interval, such as ½ vertical interval or ⅓ vertical interval. In this case, the anti-duplication control signal is not superimposed on the interval corresponding to the video signal interval highly correlative to this video signal interval (field) for outputting.

In the recording device side, the difference between the interval on which the spectrally spread anti-duplication control signal is superimposed and the interval correlative to this video signal interval on which the anti-duplication control signal is not superimposed is calculated. In other words, in the recording device 30 of the second embodiment, delay is adjusted so that the difference between the video signal in the interval on which the anti-duplication control signal is superimposed and the interval which is correlative to that interval can be calculated.

Of course, one horizontal interval is divided into a plurality of sub-intervals, the spectrally spread anti-duplication control signal may be superimposed on one divided sub-interval or a plurality of divided sub-intervals out of the divided sub-intervals.

As described herein above, in the case that the video signal interval on which the spectrally spread anti-duplication control signal is to be superimposed is so long as to be equal to a plurality of vertical intervals, or to the contrary, the video signal interval is so short as to be equal to ¼ vertical interval or ⅛ vertical interval, the PN code generator suitable for such video signal may be used.

Further, in the case that the PN code generator which generates a long PN code string having one period of, for example, four vertical intervals, the PN code string suitable for the video signal interval on which the anti-duplication control signal is to be superimposed is may be generated by stopping temporarily the PN code generator using the enable signal supplied to the PN code generator.

Further, for example, two PN code generators for generating the PN code string having one period of one vertical interval are provided, and used with switching, thereby, for example, the video signal interval on which the anti-duplication control signal is to be superimposed longer than one vertical interval can be processed properly.

Further, in the case that the PN code generator for generating a long PN code string is used, or two PN code generators are provided as described herein above, the PN code string having the same code pattern as the PN code string used for spectral spreading corresponding to the interval on which the spectrally spread anti-duplication control signal is superimposed is generated also in the recording device side by using the video signal sync signal as the reference.

In the above-mentioned embodiment, the PN code start timing signal T1 is generated with reference to the front edge of the video sync signal, however, it is by no mean limited to the case, the phase relation between respective signals may be deviated arbitrarily, for example, the position delayed by several clocks from the front edge of the video sync signal may be applied as the reference.

Further, in the above-mentioned embodiment, the case of the analog connection in which an analog video signal is supplied from the output device to the recording device is described for description. However, the present invention may be applied to the case of digital connection.

In other words, the spectrally spread anti-duplication control signal can be superimposed either on the analog video signal and on the digital video signal.

Further, in the recording device 20 and recording device 30, the video signal to be supplied to the SS anti-duplication control signal detection section is subjected to filtration previously, and only the low level video signal on which the spectrally spread anti-duplication control signal is superimposed is extracted, and then the extracted video signal may be supplied to the SS anti-duplication control signal detection section.

In the above-mentioned embodiment, the case that the output device 10 and recording device 20 are DVD devices is described. However, the present invention is by no means limited to the case, and it is possible to apply the present invention to the output device and recording device of a video disk and video CD. In other words, the present invention can be applied to either analog apparatus such as an analog VTR and digital apparatus such as a DVD device.

In the above-mentioned embodiment, the anti-duplication control signal added in the video signal recorded on the recording medium 100 is extracted, spectrally spread using the PN code, and superimposed on the video signal to be supplied to the recording device 20 or recording device 30. However, a recording medium having the recorded video signal on which the spectrally spread anti-duplication control signal was previously superimposed may be used.

In detail, for example, the anti-duplication control signal is spectrally spread using the PN code string generated every second vertical interval with respect to the video signal to be recorded on the recording medium and the resultant signal is superimposed on the video signal. A recording medium having the recorded video signal on which the anti-duplication control signal was superimposed every second vertical interval is prepared.

In the case of the recording medium having the recorded video signal on which the spectrally spread anti-duplication control signal was previously superimposed as described herein above, it is not necessary to perform processing such as extraction of the anti-duplication control signal, generation of the PN code, spectral spread, and superimposition of the spectrally spread anti-duplication control signal on the video signal.

In the case of the recording medium having the recorded video signal on which the spectrally spread anti-duplication control signal was previously superimposed, the recording device side having the function to perform inversion spectral spread to extract the anti-duplication control signal can extract the anti-duplication control signal superimposed previously on the video signal and perform duplication control effectively.

Alternatively, an anti-duplication control signal generation section is provided to the output device, and the anti-duplication control signal generated in the output device is spectrally spread using the PN code string and superimposed on the video signal, and then output.

In this case, even if the anti-duplication control signal is not recorded originally on the recording medium or the spectrally spread anti-duplication control signal is not superimposed, duplication control is performed in the recording device side using the anti-duplication control signal which was generated in the output device and superimposed on the video signal.

In the above-mentioned embodiment, while the case that the output device and recording device of DVD devices are used as the duplication prevention control device is described, the present invention is by no means limited to the case. For example, the present invention can be applied to the case of an output device for outputting television signals in a broadcasting station side in which the spectrally spread anti-duplication control signal is superimposed on the television signal to be transmitted and then the television signal is transmitted. In the receiving side, inversion spectral spread is performed to extract the anti-duplication control signal string superimposed on the video signal, and duplication prevention control of the video signal is performed based on the anti-duplication control signal.

Of course, the present invention can be applied to the output device and receiving device for video signal transmitted through a cable as in the case of cable television.

Further, in the above-mentioned first and second embodiments, the case that the anti-duplication control signal of the video signal is superimposed as the additional information is described. However, the present invention is by no means limited to the case.

For example, a copyright information which functions to identify copyright holder of the image to be played back from the video signal may be spectrally spread and superimposed on the video signal. In this case, because the copyright information superimposed on the video signal is extracted by inversion spectral spread and hence the copyright holder is recognized, the copyright information is useful for preventing the copyright from being pirated, and useful for warning the piracy in the case of use of an image of the copyright holder without permission.

Further, to eliminate the adverse effect of high level video signals when the additional information is extracted from the video signal on which the spectrally spread additional information is superimposed as described hereinbefore, it is considered as a method that the video signal on which the spectrally spread additional information is not superimposed (original software) is recorded on a recording medium for preparation, and by subtracting the video signal on which the additional information is not superimposed from the video signal on which the additional information is superimposed, the spectrally spread additional information superimposed on the video signal is extracted.

However, in this case, the original software should be prepared previously. Hence, if the original software is not available in hand, it is impossible to cancel the video signal component and extract only the spectrally spread additional information component.

On the other hand, according to the above-mentioned video signal output device and video signal recording device in accordance with the present invention, the additional information superimposed on the video signal can be extracted without adverse effect of the video signal and without using the original software on which the additional information is not superimposed.

As described hereinbefore, according to the video signal transmission method, superimposed information extraction method, video signal output device, video signal recording device, and video signal recording medium in accordance with the present invention, the video signal is canceled between the video signal in the video signal interval on which the additional information is superimposed and the video signal in the adjacent video signal interval on which the additional information is not superimposed because of correlation of field or frame of the video signal, or correlation between horizontal scanning lines, and the spectrally spread additional information superimposed on the video signal can be extracted rapidly and correctly.

Thereby, the detection efficiency of the additional information superimposed on the video signal is improved and the spread gain during spectral spreading is reduced.

Further, generation of the spread code at the timing based on the video sync signal allows the output side and receiving side of the video signal to start generation of the spread code at the same timing as that of the video sync signal. Thus, inversion spectral spreading in the recording device can be performed rapidly.

What is claimed is:

1. A superimposed information extraction method for extracting an additional information from a video signal on which spectrally spread additional information is superimposed every other interval of predetermined correlative video signal intervals, comprising the steps of:

performing inversion spectral spreading using a first spread code identical to that used for spectrally spreading said additional information for a first interval, on which said spectrally spread additional information is superimposed, of said predetermined correlative video signal intervals, and on the other hand, using a second spread code having a polarity different from that used for spectral spreading for a second interval on which said spectrally spread additional information is not superimposed.

2. The superimposed information extraction method as claimed in claim 1, wherein said predetermined correlative video signal intervals are determined based on a video sync signal.

3. The superimposed information extraction method as claimed in claim 1, wherein said first spread code for inversion spectral spreading said additional information is generated synchronously with a video sync signal.

4. The superimposed information extraction method as claimed in claim 1, wherein said first spread code for inversion spectral spreading said additional information is generated synchronously with said predetermined correlative video signal intervals.

5. A superimposed information extraction method for extracting an additional information from a video signal on which spectrally spread additional information is superimposed every other interval of predetermined correlative video signal intervals, comprising the steps of:

determining a difference between a first interval, on which said spectrally spread additional information is superimposed, of said predetermined correlative video signal intervals and a second interval on which said spectrally spread additional information is not superimposed, and inversion spectral spreading said resultant difference determined in said step of determining.

6. An extracting device for extracting an additional information from a video signal on which spectrally spread additional information is superimposed every other interval of predetermined correlative video signal intervals, comprising:

spread code generation means for generating an inversion spreading spread code by generating a first spread code identical to that used for spectrally spreading an additional information for a first interval, on which said spectrally spread additional information is superimposed, of said predetermined correlative video signal intervals, and by generating a second spread code having a polarity different from that used for spectral spreading for a second interval on which said spectrally spread additional information is not superimposed, and inversion spectral spread means for extracting said additional information superimposed on said video signal by performing inversion spectral spreading using said inversion spreading spread code.

7. The video signal recording device as claimed in claim 6, wherein said predetermined correlative video intervals are determined based on a video sync signal.

8. The video signal recording device as claimed in claim 6, wherein said first spread code for inversion spectral spreading said additional information is generated synchronously with a video sync signal.

9. The video signal recording device as claimed in claim 6, wherein said first spread code for inversion spectral spreading said additional information is generated synchronously with said predetermined correlative video signal intervals.

10. An extracting device for extracting an additional information from a video signal on which spectrally spread additional information is superimposed every other interval of predetermined correlative video signal intervals, comprising:

determination means for determining a difference between a first interval, on which said spectrally spread additional information is superimposed of said predetermined correlative video signal intervals and a second interval on which said spectrally spread additional information is not superimposed, spread code generation means for generating a spread code identical to that used for spectrally spreading said additional information, and inversion spectral spread means for extracting said additional information superimposed on said video signal by performing inversion spectral spreading using said spread code generated by said spread code generation means and using said difference determined by said determination means.

11. A system comprising a superimposing device for generating a video signal on which a spectrally spread additional information is superimposed and an extracting device for extracting said additional information from said video signal, said superimposing device including:

spread code generation means for generating a first spread code for spectrally spreading said additional information, spectral spread means for spectrally spreading said additional information using said first spread code generated by said spread code generation means and thereby generating spectrally spread additional information, and superimposition means for superimposing said spectrally spread additional information on a video signal every other interval of predetermined correlative video signal intervals, and said extracting device comprising:

inversion spread code generation means for generating an inversion spreading spread code by generating a second spread code that is identical to said first spread code used for spectrally spreading said additional information for a first interval, on which said spectrally spread additional information is superimposed, of said predetermined correlative video signal intervals, and by generating a third spread code having a polarity different from said first spread code used for spectral spreading for a second interval on which said spectrally spread additional information is not superimposed, and inversion spectral spread means for extracting said additional information superimposed on said video signal by performing inversion spectral spreading using said inversion spreading spread code.

12. A system comprising a superimposing device for generating a video signal on which a spectrally spread additional information is superimposed and a extracting device for extracting said additional information from said video signal, said superimposing device including:

spread code generation means for generating a first spread code for spectrally spreading said additional information, spectral spread means for spectrally spreading said additional information using said first spread code generated by said spread code generation means and thereby generating spectrally spread additional information, and superimposition means for superimposing said spectrally spread additional information on a video signal every other interval of predetermined correlative video signal intervals, and said extracting device comprising:

determination means for determining a difference between a first interval, on which said spectrally spread additional information is superimposed, of said predetermined correlative video signal intervals and a second interval on which said spectrally spread additional information is not superimposed, inversion spread code generation means for generating a second spread code identical to said first spread code using for spectrally spreading said additional information, and inversion spectral spread means for extracting said additional information superimposed on said video signal by performing inversion spectral spreading using said second spread code generated by said inversion spread code generation means and using said difference determined by said determination means.

\* \* \* \* \*